(12) United States Patent
Hamers et al.

(10) Patent No.: US 10,820,588 B2
(45) Date of Patent: Nov. 3, 2020

(54) COMPOSITIONALLY AND MORPHOLOGICALLY CONTROLLED NANOSTRUCTURES FOR DELIVERY OF MICRONUTRIENTS AND SUPPRESSION OF DISEASE IN AGRICULTURE

(71) Applicant: Wisconsin Alumni Research Foundation, Madison, WI (US)

(72) Inventors: Robert John Hamers, Madison, WI (US); Jaya Borgatta, Brooklyn, NY (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 16/549,005

(22) Filed: Aug. 23, 2019

(65) Prior Publication Data

US 2020/0060263 A1 Feb. 27, 2020

Related U.S. Application Data

(60) Provisional application No. 62/722,340, filed on Aug. 24, 2018.

(51) Int. Cl.
*A01N 25/08* (2006.01)
*A01N 59/26* (2006.01)

(52) U.S. Cl.
CPC ............ *A01N 25/08* (2013.01); *A01N 59/26* (2013.01)

(58) Field of Classification Search
CPC ................................ A01N 25/08; A01N 59/26
See application file for complete search history.

(56) References Cited

U.S. PATENT DOCUMENTS

| | | | |
|---|---|---|---|
| 5,374,294 A | 12/1994 | Moore | |
| 2009/0186275 A1 | 7/2009 | Exnar et al. | |
| 2015/0368811 A1* | 12/2015 | Gray | C25B 1/04 205/630 |

OTHER PUBLICATIONS

Zhang et al. Cupric Phosphate Nanosheets-Wrapped Inorganic Membranes with Superhydrophilic and Outstanding Anticrude Oil-Fouling Property for Oil/Water Separation. ACS Nano 2018, 12:795-803. (Year: 2018).*
Shen et al. 2D nanosheets-based novel architectures: Synthesis, assembly and applications. Nano Today 11 (2016) 483-520. (Year : 2016).*
Ma et al., Time-Dependent Transcriptional Response of Tomato (Solanum lypopersicum L. To Cu Nanoparticle Exposure upon Infection with Fusarium oxysporum f. sp. Lycoperici, ACS Sustainable Chem. Eng. 2019, 7, 10064-10074.
Hanawalt et al, Chemical Analysis by X-Ray Diffraction, Classification and Use of X-Ray Diffraction Patterns, vol. 10, No. 9, pp. 457-512, From Industrial and Engineering Chemistry, Sep. 15, 1938.
Giannousi et al., "Synthesis, characterization and evaluation of copper based nanoparticles as agrochemicals against Phytophthora infestans", RSC Adv., 2013, 3, 21743-21752.
Ingle et al., "Copper nanoflowers as effective antifungal agents for plant pathogenic fungi," IET Nanobiotechnol., 2017, vol. 11 Iss. 5, pp. 546-551.
Xie et al., "Development of Copper Phosphate Nanoflowers on Soy Protein toward a Superhydrophobic and Self-Cleaning Film," ACS Sustainable Chem. Eng. 2017, 5, 869-875.

* cited by examiner

*Primary Examiner* — Robert A Wax
*Assistant Examiner* — Olga V. Tcherkasskaya
(74) *Attorney, Agent, or Firm* — Bell & Manning, LLC; N. Meredith Porembski

(57) ABSTRACT

Provided are compositions which may be used in agricultural applications. Also provided are methods of making and using the compositions. In embodiments, a plant fungicide or plant bactericide is provided comprising a nanostructured chemical compound, the chemical compound comprising a metal and a coordinating anion, wherein the nanostructured chemical compound is in the form of a plurality of planar, two-dimensional nanostructures.

14 Claims, 18 Drawing Sheets

COMPOSITIONALLY AND MORPHOLOGICALLY CONTROLLED NANOSTRUCTURES FOR DELIVERY OF MICRONUTRIENTS AND SUPPRESSION OF DISEASE IN AGRICULTURE

CROSS-REFERENCE TO RELATED APPLICATIONS

The present application claims priority to U.S. Provisional Patent Application No. 62/722,340 that was filed Aug. 24, 2018, the entire contents of which are hereby incorporated by reference.

REFERENCE TO GOVERNMENT RIGHTS

This invention was made with government support under 1503408 awarded by the National Science Foundation. The government has certain rights in the invention.

BACKGROUND

As the global population continues to grow toward 9.7 billion by 2050 (UN 2015), new agricultural production strategies must be explored to achieve sustainable food security, especially as water and arable land become more limited resources. A number of innovations and amendments in agricultural practices have been proposed to increase crop yields with minimal additional input of resources. These practices include using sensors to monitor crop quality, prescriptive planting, genetic modification, and the development of new agrichemical delivery systems. Crop losses from disease and pests remain a significant problem, leading to severe decreases in yield and subsequent economic losses, thus threatening overall food security. One area of active focus has been on micronutrients, which are known to be critical to plant response against disease by acting as enzyme co-factors to promote the formation of defensive secondary metabolites. However, micronutrient availability in soil is often low due to either alkaline conditions or complexation with organic matter. In addition, translocation from leaves to roots is restricted for many nutrients, meaning that foliar applications are largely ineffective for root pathogens such as fungi and nematodes.

SUMMARY

Provided are compositions which may be used in agricultural applications. Also provided are methods of making and using the compositions.

In one aspect, plant fungicides and plant bactericides are provided. In embodiments, a plant fungicide/bactericide comprises a nanostructured chemical compound, the chemical compound comprising a metal and a coordinating anion, wherein the nanostructured chemical compound is in the form of a plurality of planar, two-dimensional nanostructures.

In another aspect, method of treating plants are provided. In embodiments, a method of treating a plant comprises applying a plant fungicide or a plant bactericide to at least a portion of a plant. The plant fungicide/bactericide comprises a nanostructured chemical compound, the chemical compound comprising a metal and a coordinating anion, wherein the nanostructured chemical compound is in the form of a plurality of planar, two-dimensional nanostructures.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

FIG. 2A shows deionized water. FIG. 2B shows a nonionic surfactant for use with plants sold under the trademark Regulaid®. Throughout the present disclosure the term "Regulaid®" refers to this nonionic surfactant. FIG. 2C shows malic and citric acid mixture. FIG. 2D shows malic and citric acid mixture with added Regulaid®. Lines were generated from an exponential fit to the data.

FIG. 3A shows the reduction of the area under the disease progress curve (AUDPC) with respect to foliar nanoparticle treatments. FIG. 3B shows changes in the total wet mass with respect to foliar treatment. FIG. 3C shows the change in the AUDPC with respect to repeated foliar treatment and root applications of CuO NP and $Cu_3(PO_4)_2 \cdot 3H_2O$ nanosheets. FIG. 3D shows changes in total wet mass with respect to repeated foliar applications and root exposure. For repeated applications, "2×" indicates two separate foliar treatments of either 20 mg/L or 200 mg/L. A one-way ANOVA with an SNK multiple comparison test was used to determine significance across all the treatments. Values in each panel followed by different letters were significantly different at $p<0.05$.

FIG. 5A represents disease progress for the Lockwood (Location 1) and Griswold (Location 2) fields using applications of CuO NP and $Cu_3(PO_4)_2 \cdot 3H_2O$ nanosheets compared to a $CuSO_4$ salt control. CuO NP were not used in the Griswold field. FIGS. 5B and 5C represent the total yield of Cu-based nanomaterial treated watermelon with or without *Fusarium* infection for the Lockwood and Griswold locations, respectively. A one-way ANOVA with an SNK multiple comparison test was used to determine significance across all the treatments. For FIG. 5A, the analysis was within a location. For FIGS. 5B and 5C, the analysis was across all treatments. Values in each panel followed by different letters were significantly different at $p<0.05$.

DETAILED DESCRIPTION

Figures 1A, 1B:
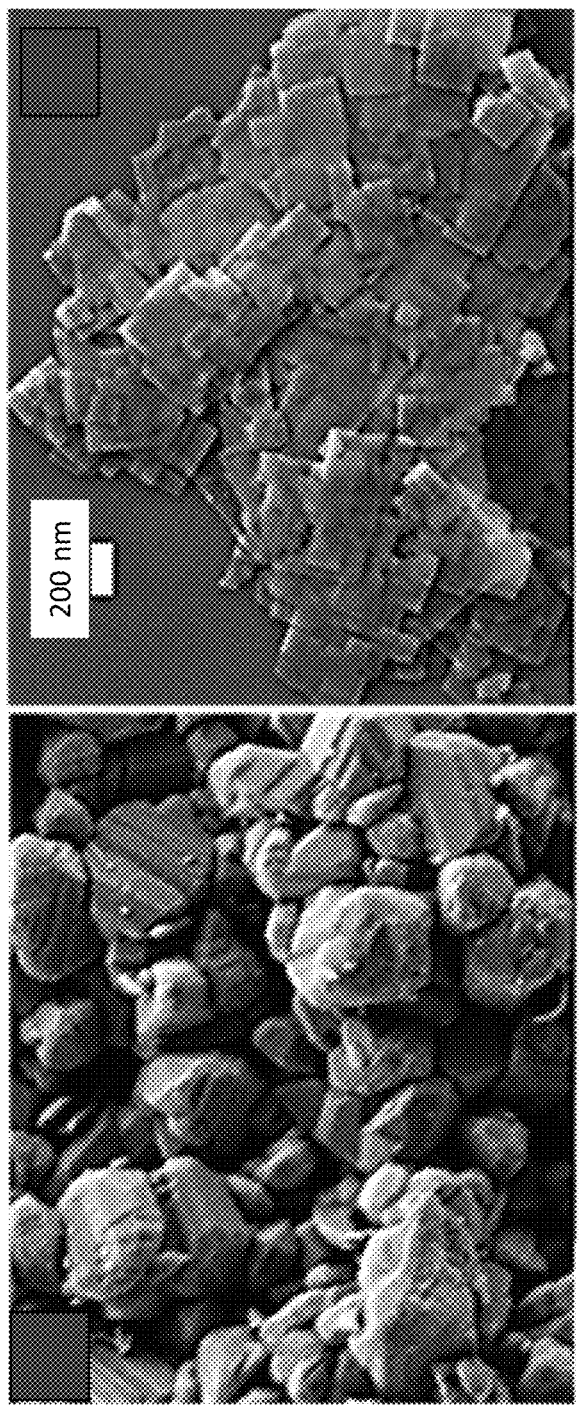
FIG. 1A shows micrographs of CuO nanoparticles.
FIG. 1B shows micrographs of $Cu_3(PO_4)_2 \cdot 3H_2O$ nanosheets.

The present compositions may be used to treat plants, e.g., cultivated plants. In at least some embodiments, the treatment results in increased yield from the treated plants and/or increased resistance to a disease, e.g., a fungal disease, as compared to other plant treatments. In addition, such treatments achieve these results with a reduced environmental exposure to active components within the compositions, e.g., metals.

The present compositions comprise a nanostructured chemical compound, the chemical compound comprising a metal and a coordinating anion. The metal and the coordinating anion are present in stoichiometric amounts, which depends upon the particular selection of the metal/the coordinating anion. Because chemical bonds are formed between the metal and the coordinating anion, the compositions are distinguished from compositions comprising a composite of a metal compound and another compound comprising the coordinating anion. In the chemical compound of the present compositions, combinations of different metals (e.g., metal alloy) and different coordinating anions may be used.

A variety of metals may be used. The metal may be or may comprise a micronutrient to a selected plant. Illustrative metals include Cu, Fe, Zn, Mn, B, Si, and Ti. (For purposes of this disclosure, the metalloids B and Si are considered to be metals.) Similarly, a variety of coordinating anions may be used. The coordinating anion may be or may comprise a macronutrient to a selected plant. Illustrative coordinating anions include phosphate ($PO_4^{3-}$), nitrate ($NO_3^-$), sulfate ($SO_4^{2-}$), oxygen (O), and hydroxide (OH). Oxyanions may also be used as coordinating anions including borate ($BO_3^{3-}$), carbonate ($CO_3^{3-}$) and silicate ($SiO_3^{3-}$).

The combination of the metal and the coordinating anion may be selected to provide a chemical compound that has a desired solubility in a liquid medium. In embodiments, the chemical compound provides a 10% release of metal ions within the first hour of dissolving at 25° C. (with a starting concentration of 100 mg/L in water).

Illustrative chemical compounds include $Cu_3(PO_4)_2$ (which may be referenced in its hydrated form, $Cu_3(PO_4)_2 \cdot 3H_2O$), $Zn_3(PO_4)_2$, $(Cu/Zn)_3(PO_4)_2$, $(Cu/Al)_3(PO_4)_2$, and $Mn_3(PO_4)_2$. Regarding $(Cu/Al)_3(PO_4)_2$, since Al is always in the $3^+$ oxidation state and Cu is in the $2^+$ state, the formula of this compound may be represented by $Cu_{(3-3x)}Al_{2x}(PO_4)_2$, where $0 \leq x \leq 1$. The chemical compound of the present compositions is nanostructured, a term which refers to the chemical compound in its solid form, in the form of distinct, distinguishable nanostructures (e.g., as visualized via micrographs (see FIG. 1B)). The nanostructures have at least one dimension of about 100 nm or less. The nanostructures may be further characterized by their shape and dimensions. In embodiments, the nanostructures have a planar, two-dimensional morphology. In embodiments, such nanostructures may be characterized by a thickness $t_d$, which may be 100 nm or less, 75 nm or less, 50 nm or less, 25 nm or less, 15 nm or less, or in the range of from about 10 nm to 100 nm. The other two dimensions (the lateral dimensions) are significantly greater than the thickness $t_d$, e.g., 5 times, 10 times, 50 times, 100 times, etc. greater than the $t_d$. These other two dimensions may be of similar magnitude to each other, although this is not necessary. The overall shape of the nanostructure as defined by these other two dimensions is not particularly limited, e.g., circular, elliptical, rectangular, or square shapes may be used. By way of illustration, for rectangular shapes, the planar, two-dimensional nanostructures may be characterized by a length $l_d$ and a width $w_d$ (the lateral dimensions). The length $l_d$ and width $w_d$ may each be in the range of from 25 nm to 750 nm, 50 nm to 500 nm, or 100 nm to 250 nm. In embodiments, at least one dimension, at least two dimensions, or all three dimensions are selected so that the nanostructure can pass through the stomata of a selected plant. Planar, two-dimensional nanostructures may be referred to herein as "nanosheets." It is noted that "nanoflowers" are not encompassed by the phrase "planar, two-dimensional nanostructures" since nanoflowers are not sufficiently planar. In other words, nanoflowers are not planar, two-dimensional nanostructures.

The dimensions of the nanostructures referenced above may be average values where "average" refers to an average value over a representative number of nanostructures. Atomic force microscopy (AFM) may be used to determine the dimensions of the nanostructures. Scanning electron microscopy (SEM) and/or transmission electron microscopy (TEM) may also be used to characterize the dimensions and shapes of the nanostructures.

As noted above, nanostructures having other shapes and/or dimensions may be used. In other embodiments, the nanostructures have a one-dimensional morphology having two dimensions of about 100 nm or less and the third dimension significantly greater. Such nanostructures may be referred to as nanowires, nanorods, nanotubes, etc.

The present compositions may comprise additional components such as stabilizers, surfactants, fertilizers, insecticides, etc. By "stabilizer" it is meant a component that adsorbs to a surface of the nanostructure and confers a net charge to the nanostructure, thereby increasing the stability of colloidal suspensions of the nanostructures via electrostatic repulsion. Some examples of stabilizers include phosphate, citrate, malate, formate, and acetate. Various types of surfactants may be used to facilitate forming homogeneous dispersions of the nanostructures in liquid media, e.g., an aqueous medium. Various types of fertilizers and insecticides may be used to promote plant health.

The present compositions may be provided, and used, in solid form (containing no or very little liquid) or in liquid form (comprising some liquid, thereby providing a slurry, or a significant amount of liquid, thereby providing a suspension). Use of the compositions to treat plants generally involves a liquid formulation, e.g., a suspension. The amount of the nanostructured chemical compound in the liquid formulation may be selected to achieve a desired treatment result such as a desired yield and/or desired suppression of a disease. Thus, the specific amount will depend upon the plant and/or the disease. However, as compared to other plant treatments, much less of the nanostructured chemical compounds may be required to achieve similar results. By way of illustration, as further described below, $Cu_3(PO_4)_2 \cdot 3H_2O$ nanosheets at 10 mg/L in a liquid medium of water/surfactant significantly repressed fungal disease as measured by a 58% decrease in disease progress. By comparison, in order to achieve statistically significant suppression, the amount of CuO spherical nanoparticles was increased to 1000 mg/L in a liquid medium of water/surfactant. Thus, $Cu_3(PO_4)_2 \cdot 3H_2O$ nanosheets are about 10-100 times more effective than CuO spherical nanoparticles at the same mass of material. This is true even though $Cu_3(PO_4)_2 \cdot 3H_2O$ nanosheets have only about 3 times as much surface area as the CuO spherical nanoparticles. This result is even more surprising given that CuO is about 85% Cu by mass while $Cu_3(PO_4)_2 \cdot 3H_2O$ is about 44% by mass.

The nanostructured chemical compounds may be made using a polyol process. In such a process, a metal precursor containing the desired metal (e.g., a metal salt) is combined with a polyol to form a first solution which is refluxed at an elevated temperature for a time. Next, a coordinating anion precursor (e.g., a salt of the coordinating anion) is injected into the first solution to form a second solution. The second solution is refluxed at an elevated temperature for a time to induce the reaction between the precursors to provide the chemical compound. Centrifugation, rinsing, and drying may be used to recover the solid nanostructured chemical compound. Additional illustrative details of the process may be found in the Example below and in U.S. Pat. Pub. No. 20090186275, which is hereby incorporated by reference in its entirety. The nanostructured chemical compound may be combined, mixed, blended, etc. with desired additives (described above) either before or after adding a liquid medium (such as water) to provide a ready-to-use formulation.

As noted above, the present compositions may be used to treat plants. Such methods comprise applying any of the compositions to at least a portion of a plant. Application to the plant may be achieved using a variety of techniques, including coating, spraying, immersing, etc. Any portion of the plant may be contacted with the compositions, e.g., the stem, leaf, flower, root. However, in embodiments, the compositions are not applied, i.e., not directly applied, to the root of the plant. In embodiments, the compositions are only directly applied to plant foliage. The methods may comprise a single application of the compositions, i.e., the compositions are only applied a single time. In other embodiments, repeated applications of the compositions may be used. A variety of plants may be treated using the compositions, including cultivated plants such as tomatoes, cucumbers, watermelon, soybeans, citrus plants, eggplants, etc.

As noted above, the present compositions and methods of using the compositions to treat plants can increase plant yield and/or increase disease resistance. As such, the compositions and methods may be characterized by increases in yield and/or disease resistance achieved under certain conditions. A variety of diseases may be targeted by the present methods, including bacterial and fungal diseases including *Xanthamonas, Fusarium*, etc. A specific, illustrative fungal disease is described in the Example, below.

Regarding yield, yield may be assessed by measuring a plant's wet mass after a treatment and comparing to a control (untreated) plant's wet mass. Wet mass refers to the total weight of a harvested, undried plant. Yield may further refer to yield of a plant which has been/is exposed to a certain disease. In embodiments, the present composition/method is characterized as providing an increase in yield of at least 30%, at least 40%, at least 50%, at least 60%, at least 70%, at least 80%, etc. These values can refer to a specific treatment protocol, e.g., the "dip exposure" protocol as described in the Example below. This protocol specifies the concentration of the nanostructured chemical compound in a liquid medium, the liquid medium composition, the dip exposure process, the growth/transplant conditions for the plant, etc. These values can refer to a specific nanostructured chemical compound, e.g., $Cu_3(PO_4)_2 \cdot 3H_2O$, a specific plant, e.g., a watermelon plant, and a specific disease, e.g., *F. oxysporum* f. sp. *niveum*.

Regarding resistance, resistance may be assessed by monitoring a plant's health and plotting an "area-under-the-disease-progress curve (AUDPC)" as described in the Example, below. Such a plot measures resistance via monitoring disease progression in a plant which has been/is exposed to a certain disease. In embodiments, the present composition/method is characterized as providing an increase in resistance to a disease/decrease of disease progression of at least 30%, at least 40%, at least 50%, at least 60%, at least 70%, at least 80%, etc. Again, these values can refer to a specific treatment protocol, e.g., the "dip exposure" protocol, a specific nanostructured chemical compound, e.g., $Cu_3(PO_4)_2 \cdot 3H_2O$, a specific plant, e.g., a watermelon plant, and a specific disease, e.g., *F. oxysporum* f. sp. *niveum*, as described in the Example below.

EXAMPLES

Example 1

Additional detail for the experiments described in this Example may be found in the Appendices of U.S. Provisional Patent Application 62/722,340, which is hereby incorporated by reference in its entirety.

With increasing global population, innovations in agriculture will be essential for a sustainable food supply. In this example, commercial CuO NP was compared to synthesized $Cu_3(PO_4)_2 \cdot 3H_2O$ nanosheets to determine the influence of coordinating anion, particle morphology, and dissolution profile on *Fusarium oxysporum* f. sp. *niveum* induced disease in watermelon. Copper dissolution in organic acid solutions that mimic complexing agents found in plants was increased by two orders of magnitude relative to water. $Cu_3(PO_4)_2 \cdot 3H_2O$ nanosheets showed a rapid initial dissolution, with equilibration after 24 hours; CuO NP exhibited continuous particle dissolution. In a greenhouse study, $Cu_3(PO_4)_2 \cdot 3H_2O$ nanosheets at 10 mg/L significantly repressed fungal disease as measured by yield and by a 58% decrease in disease progress. Conversely, CuO NP only yielded significant effects on disease at 1000 mg/L. In field studies, similar enhanced disease suppression was noted for NP $Cu_3(PO_4)_2 \cdot 3H_2O$ nanosheets, although biomass and yield effects were variable. The method of application was a significant factor in treatment success, with the dip method being more effective than foliar spray.

Materials and Methods

Materials and Synthesis.

CuO NP (30 nm diameter; powder) was obtained from U.S. Research Nanomaterials (Houston, Tex.). Copper chloride dihydrate, ammonium phosphate monobasic, and diethylene glycol were obtained from Sigma Aldrich (St. Louis, Mo.). All reagents were used without further purification. $Cu_3(PO_4)_2 \cdot 3H_2O$ nanosheets were synthesized using a polyol method. (Kim, D.-H. et al., *Electrochemical and Solid-State Letters* 2006, 9 (9), A439-A442; Wang, D. et al., *Journal of Power Sources* 2009, 189 (1), 624-628.) Nanoparticles of $Cu_3(PO_4)_2 \cdot 3H_2O$ formed in a two-dimensionally sheet-like morphology; these are referred to as "nanosheets." First, 4 mL of 2 M $CuCl_2 \cdot 2H_2O$ was added to 20 mL of diethylene glycol, and the mixture was heated to 140° C. under reflux for one hour. A 4-mL aliquot of 1.3 M solution of $NH_4H_2PO_4$ was then rapidly injected into the reaction mixture, and the reaction proceeded for 5 hours. The nanosheets were then isolated by centrifugation at 5000 rpm using a Thermo Fischer Sorvall Legend X1R centrifuge and were then rinsed with ethanol (2×) and water (1×), followed by drying overnight under vacuum. For all experiments, the nominal mass concentration expressed as mg/L of the two nanoscale materials was kept constant, and that is what is presented in the results. However, it is specifically noted that measured elemental Cu contribution (described below) in the CuO NP was 85±6%, whereas for $Cu_3(PO_4)_2 \cdot 3H_2O$ nanosheets the value was 44±4%. This will again be noted in the results for cases where this is particularly relevant or instructive.

Nanomaterial Characterization.

Samples for nitrogen physisorption characterization with Brauner Emmet Teller (BET) analysis were degassed overnight at 120° C. under vacuum. The samples were analyzed using a Micrometrics Gemini VII 2390 surface analyzer (Norcross, Ga.) to measure nitrogen adsorption isotherms. Samples for X-ray powder diffraction were prepared by pressing the nanomaterials into a thin layer of grease on a zero-diffraction plate (B-doped Si, MTI Corporation). Sample analysis was performed using a Bruker Advance powder diffractometer (Spring, Tex.) fitted with a Cu Kα source and a Lynxeye detector. The collected patterns were modified by subtracting the background and stripping the $K\alpha_2$ peaks using Bruker software DIFFRAC.EVA (Spring, Tex.). Samples were prepared for SEM by drop-casting a dilute solution of nanoparticles suspended in isopropanol on a conductive boron-doped silicon wafer. A LEO Supra55 VP field-emission scanning electron microscope (Zeiss, Germany) was used to obtain micrographs of the nanomaterials. Cu concentrations of nanomaterials were determined by digesting approximately 3 mg of the powders in 2 mL of aqua regia overnight. After diluting the samples to a final volume of 10 mL, they were analyzed using inductively coupled optical emission spectroscopy (ICP-OES, Perkin Elmer 4300 Dual View, Shelton, Conn.).

Dissolution Experiments.

Solutions of 100 mg/L CuO NP or $Cu_3(PO_4)_2 \cdot 3H_2O$ nanosheets were generated by suspending the nanomaterials in deionized (DI) water (18 MΩ·cm, Barnstead systems) adjusted to pH 7, DI water with 1 mL/L of Regulaid® non-ionic surfactant (Kalo Inc, Overland Park, Tex.) adjusted to pH 7, simulated xylem sap consisting of 890 µM malic acid and 1,706 µM citric acid buffered with NaOH to pH 6, or simulated xylem sap prepared with 1 mL/L of Regulaid®. It is noted that the simulated sap has a lower pH, and the impact of this more environmentally relevant solution on nanoscale dissolution was of interest. Triplicate samples of each solution were placed under constant agitation at 100 rpm using a New Brunswick C24 incubator shaker held at 30° C., and aliquots were sampled at specific intervals (1 h, 12 h, 24 h, 7 d, 21 d). Nanoparticles were removed from suspension by centrifugation at 5000 rpm, and the supernatant was then analyzed for Cu by ICP-OES (Perkin Elmer 4300 Dual View, Shelton, Conn.). Comparable studies were separately conducted at particle concentrations of 1000 mg/L in the pH 6 organic acid solution and in pH 7 DI water.

In Vitro Toxicity.

The toxicity of the two Cu nanomaterials to the pathogen *F. oxysporum* f. sp. *niveum* was examined in shake culture. Fifty mL of sterile potato dextrose broth (Difco Laboratories, Livonia, Mich.) was added to 125 mL Erlenmeyer flasks that were amended with 0, 50, and 500 mg/L of CuO NP or $Cu_3(PO_4)_2 \cdot 3H_2O$ nanosheets. Flasks were seeded with a colonized agar plug of *F. oxysporum* f. sp. *niveum* and were set on a platform shaker at 125 rpm for 5 days at 22° C. Mycelial mats were harvested under vacuum onto pre-weighed Whatman #1 filter paper that had been dried at 50° C. for 18 hr. The mycelia-containing filter papers were re-dried at 50° C. for at least 18 hours and weighed. There were two replicate flasks per nanoparticle type and concentration. In addition, to determine the contribution of NP to the mass, additional controls were run without the fungus. These final weights were averaged by treatment and subtracted from the fungal weights to isolate the actual effect of NP on the pathogen.

Greenhouse Experiments.

Watermelon seeds (*Citrullus lanatus* Thunb. cv Sugar Baby, Harris Seed Co., Rochester, N.Y.) were germinated in soilless potting mix (ProMix BX, Premier Hort Tech, Quakertown, Pa., USA) and fertilized once after three weeks with 40 mL of Peter's soluble 20-10-20 (N—P—K) fertilizer (R. J. Peters Inc., Allentown, Pa.). When plants reached the 3- to 4-leaf stage, uniform medium size plants were selected for NP exposure. Different concentrations of $Cu_3(PO_4)_2 \cdot 3H_2O$ nanosheets or CuO NP (both in suspension) were prepared in DI water (10-1000 mg/L). For CuO NP, the suspension was sonicated using a probe sonicator for 2 min in an ice bath. For $Cu_3(PO_4)_2 \cdot 3H_2O$ nanosheets, the suspension was sonicated in a bath sonicator for 5 min; this less intense sonication method was used out of concern over possible breakage of the nanosheets. It is noted that, qualitatively, this less intense technique resulted in a more stable nanosheet dispersion than that achieved with CuO NP and the probe sonicator. One to two drops (1 ml/L) of Regulaid® nonionic surfactant were added into the suspensions prior to exposure. Polyvinylidene chloride film (Saran™ wrap) was fitted around the stem to prevent soil exposure to the NP suspensions. Although the primary purpose of this work was to compare different nanoscale materials, bulk CuO and $CuSO_4$ (Sigma, St. Louis, Mo.) were used for additional comparative purposes in the greenhouse experiments.

Nanomaterial applications were made under four conditions so as to better understand the mechanistic basis for the observed results on disease and yield. First, for the "dip exposure," plants were inverted (roots up, foliage down). Each plant received approximately 0.6-0.8 mL of suspension as calculated by the volume difference from before and after exposure. The plants were then inverted and air dried for one hour prior to transplant. It is noted that the solutions were re-dispersed after treatment of 5 plants. Second, for foliar application, seedlings were sprayed with approximately 2 mL/plant of NP suspension. Third, at the time of transplant to the infected growth media, select plants received a 5 mL amendment of one of the two NP solutions at either 500 or 1000 mg/L into the root ball/zone. Fourth, select plants received two separate foliar applications of the NP solutions at 20 or 200 mg/L: once at the initial transplant as above, and a second after approximately 7 d of growth. The intent of these multiple applications was to compare repeated doses to roughly equivalent single treatments (i.e.; two 20 mg/L doses vs. a single 50 mg/L dose or two 200 mg/L doses against a single 500 mg/L dose).

*F. oxysporum* f. sp. *niveum* was prepared on Japanese millet, as previously described. The isolate of *Fusarium oxysporum* f. sp. *niveum* was cultured from infested watermelon seeds in Connecticut in 2014, and a colony originating from a single spore was stored at 4° C. This isolate is considered highly virulent and has been used extensively in research. NP-exposed and control seedlings were transplanted into potting mix infested with millet inoculum (0.75 g/L potting mix). There were 12 replicates in each NP treatment; 9 were infested with *F. oxysporum*, and the remaining three were in pathogen-free soilless mix as non-inoculated controls. All plants received 50 mL of a complete fertilizer solution (Peter's soluble 20-20-20 N, P, K) once per month, and one application of imidacloprid (according to label instructions) (Bayer, Rhein, Germany) for insect control. As symptoms of fungal disease developed, plants were rated for severity on a scale of 1 to 5 where 1=no disease, 2=slightly stunted, 3=stunted and/or partially wilted, 4=completely wilted, and 5=dead. The progress of disease as represented by the cumulative ratings of disease on replicate plants was plotted over time and the AUDPC was calculated using the trapezoid rule: AUDPC= $\Sigma[Y_i \pm Y_{(i\pm1)}]/2 \times (t_{(i\pm1)} - t_i)$, where $Y_i$=the disease rating at time $t_i$. (Jeger, M. J. et al, *Theoretical and Applied Genetics* 2001, 102 (1), 32-40.) After 6 to 8 weeks, depending on disease progress, the experiment was terminated. At harvest, the fresh shoot and root masses were separately recorded. All tissues were dried in an oven and acid digested for nutrient analysis (described below).

Field Experiments.

Field experiments were conducted to evaluate if successful greenhouse results would translate to a field application. The following six treatments were established at two field locations (Hamden, Conn.—Location 1; and Griswold, Conn.—Location 2) to evaluate their effect on growth and *Fusarium* wilt of watermelon: CuO nanoparticles, $Cu_3(PO_4)_2 \cdot 3H_2O$ nanosheets, commercial powders of CuO and $Cu_3(PO_4)_2$, $CuSO_4$, and untreated controls. The commercial powders are not nanostructured as particles within the powders typically have a range of sizes from about 1 μm to 1 mm. Again, the primary purpose of this work was to compare the efficacy of the two nanoscale materials, and the suspensions of CuO and $Cu_3(PO_4)_2$ commercial powders and the solution of $CuSO_4$ were included only for comparison. It is noted that the CuO and $Cu_3(PO_4)_2$ materials were used at concentrations where there were solid particles present in the liquid formulations, so those liquid formulations are best characterized as being suspensions with some dissolved ions. By contrast, because of its high solubility, $CuSO_4$ in liquid is completely dissolved and thus is a true solution (only ions present and no remaining solid).

Watermelon seeds ('Sugar Baby' Harris Seed Co., Rochester, N.Y.) were germinated in 36 cell liners (1 plant/cell) filled with ProMix BX potting mix and were fertilized three weeks later with 40 mL of Peter's soluble 20-10-20 (N—P—K) fertilizer. Four-week-old transplants received a foliar application in the greenhouse with 1-2 mL of one of the six Cu treatments at 400 mg/L in distilled water that was amended with Regulaid® (1 ml/L). All treatment solutions had been sonicated for at least 5 min in a FS20H Ultrasonic cleaner (Fisher Scientific Inc., Pittsburgh, Pa.) prior to application, except for CuO NP, which was sonicated in a probe sonicator (Fisher Scientific, FB505) at 50% amplitude for 2 min.

Field microplots were prepared in early June, 2017. Fertilizer (10-10-10, NPK) was spread over 0.9 m wide rows at 112 kg/ha. The rows were set 6 m apart, covered in black plastic mulch, and lined with irrigation drip tape. Rows were partitioned into 30 microplots (5.6 m²). On June 30$^{th}$ (Location 2) and July 5$^{th}$ (Location 1), two transplants were set 30 cm apart in the center of each microplot. There were six replicate microplots/treatments. Planting holes were each infested with approximately 2 g of millet inoculum and hand mixed into the soil immediately before transplanting. In addition, another 30 microplots were planted immediately adjacent to these microplots and prepared the same way, but were not infested with the millet fungal inoculum. Plants were rated for disease three times on July 18$^{th}$, August 11$^{th}$, and September 7$^{th}$ for Location 2; and on July 19$^{th}$, August 2$^{nd}$ and August 30$^{th}$ for Location 1, using the same scale described above. Total plant biomass and fruit mass were determined at harvest, and select tissues were dried for analysis by ICP mass spectrometry (ICP-MS) as noted below.

Tissue Elemental Analysis.

Root and shoot tissue from greenhouse and field experiments (4-6 replicates per treatment, depending on experiment), as well as fruit tissue from field studies, were dried in an oven at 50° C., ground in a Wiley mill, and passed through a 1 mm sieve. One medium watermelon fruit from each field plot was assayed to determine if the edible flesh portions had greater accumulation of Cu and other elements. Digestion of ground samples (0.5 g) was done in 50 mL polypropylene digestion tubes with 5 mL of concentrated nitric acid at 115° C. for 45 min using a hot block (DigiPREP System; SCP Science, Champlain, N.Y.). The Ca, Cu, Fe, K, Mg, Mn, P, S, Si, and Zn contents were quantified using ICP-OES on a Thermo Fisher iCAP 6500 (Thermo Fisher Scientific, Waltham, Mass.) or ICP-MS on an Agilent 7500ce (Agilent, Santa Clara, Calif.); element content is expressed as μg/g (dry weight) plant tissue.

Pigment Analysis.

Chlorophyll content was determined by the method of Lichtenthaler, with modification. Briefly, 50 mg of fresh tissue was harvested, cut into pieces (<1 cm), and added to 15 mL centrifuge tubes amended with 10 mL 95% ethanol. The tubes were kept in the dark for 3-5 days, and the chlorophyll content was measured by a UV-Vis spectrophotometer (Spectronic Genesis 2). Concentrations of chlorophyll a (Chla), chlorophyll b (Chlb) and total chlorophyll were determined by the following equations: $Chla=13.36A_{664.2}-5.19A_{648.6}$, $Chlb=27.43A_{648.6}-8.12A_{664.2}$, and Total chlorophyll=Chla+Chlb. Five replicates per treatment were analyzed.

Statistical Analysis.

All data are presented as mean±SE (standard error). A one-way analysis of variance (ANOVA) with the Student Newman Keuls (SNK) multiple comparison test was performed using SPSS (IBM SPSS Statistics version 20) to evaluate statistical significance. Differences were considered statistically significant when p<0.05. A Student's t-test was used for select analyses to determine statistical significance within a 95% confidence interval.

Results and Discussion

Materials Characterization of CuO and $Cu_3(PO_4)_2 \cdot 3H_2O$ Nanomaterials.

Figure 1C:
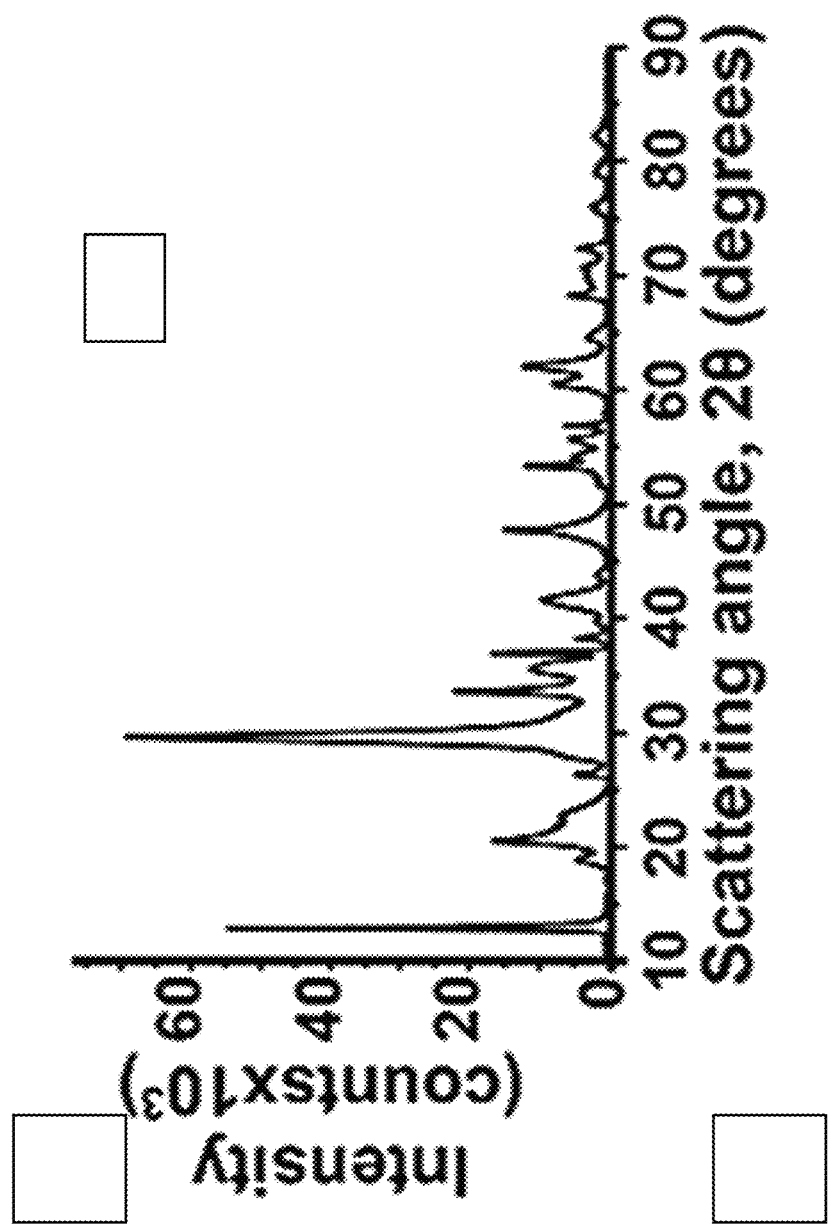
FIG. 1C shows PXRD patterns of $Cu_3(PO_4)_2 \cdot 3H_2O$ nanosheets.
Figure 1D:
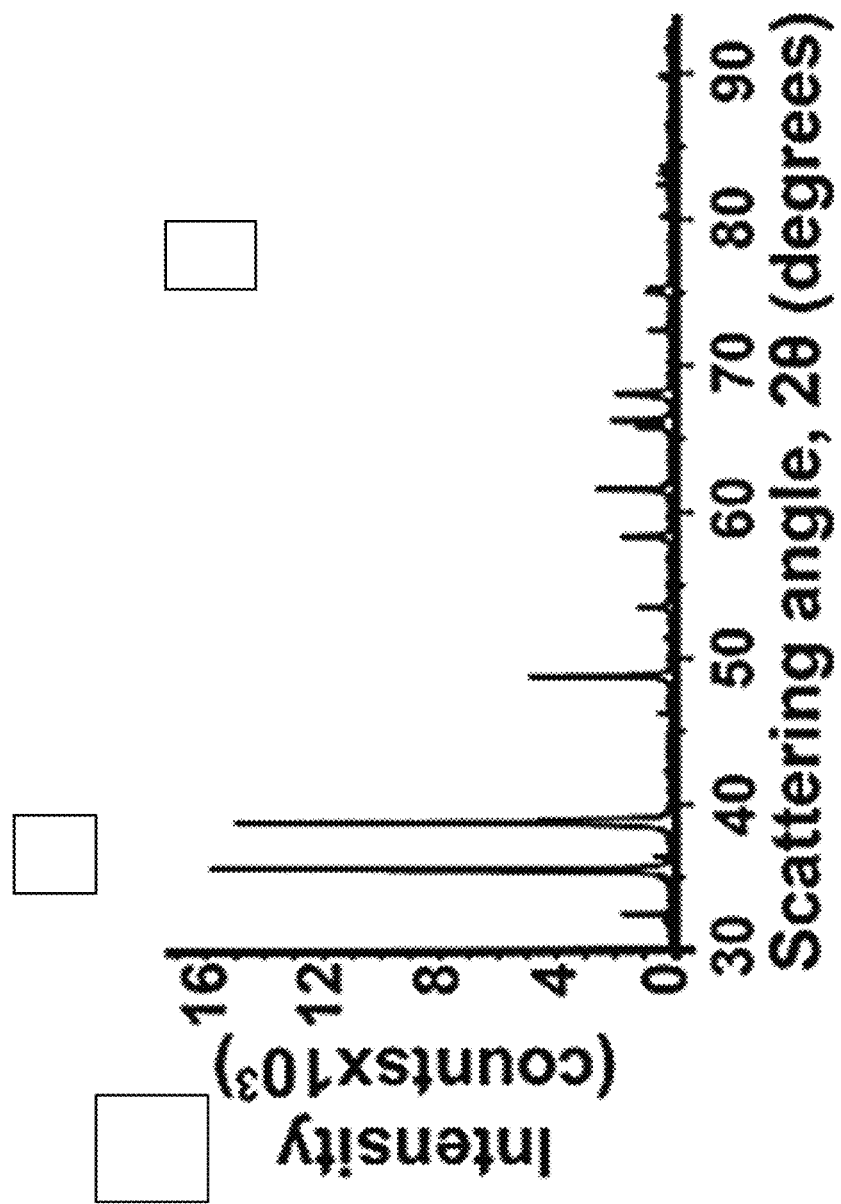
FIG. 1D shows PXRD patterns of commercial CuO nanoparticles. The scale bar is for both FIGS. 1A and 1B.

The synthesized $Cu_3(PO_4)_2 \cdot 3H_2O$ material had sheet-like morphology consistent with the anisotropic growth as observed in protein inorganic complexes (FIG. 1B). However, the fact that the synthesized nanomaterials adopted this particular morphology versus the typical particle morphology was unexpected. The sheet-like morphology resulted in a high specific surface area of 40±1 m²/g. A total of 165 exposed nanosheets were measured; the dimensions ranged from 53-608 nm, with a median value of 151 nm. The average nanosheet thickness as determined by AFM was 13 nm (±4; four replicate measurements). FIG. 1C shows the powder diffraction pattern, which is well matched to JPSD00-022-0548, indicating the composition is $Cu_3(PO_4)_2 \cdot 3H_2O$ nanosheets. The synthesis of $Cu_3(PO_4)_2 \cdot 3H_2O$ nanosheets allows for compositional comparison of the phosphate coordinating anion to the oxide. The commercial CuO NP aggregated significantly in solution and showed an irregular morphology (FIG. 1A), with a surface area of 12±2 m$^2$/g; the X-ray power diffraction pattern was consistent with a tenorite crystal structure (FIG. 1D).

Dissolution Experiments.

Figure 2A:
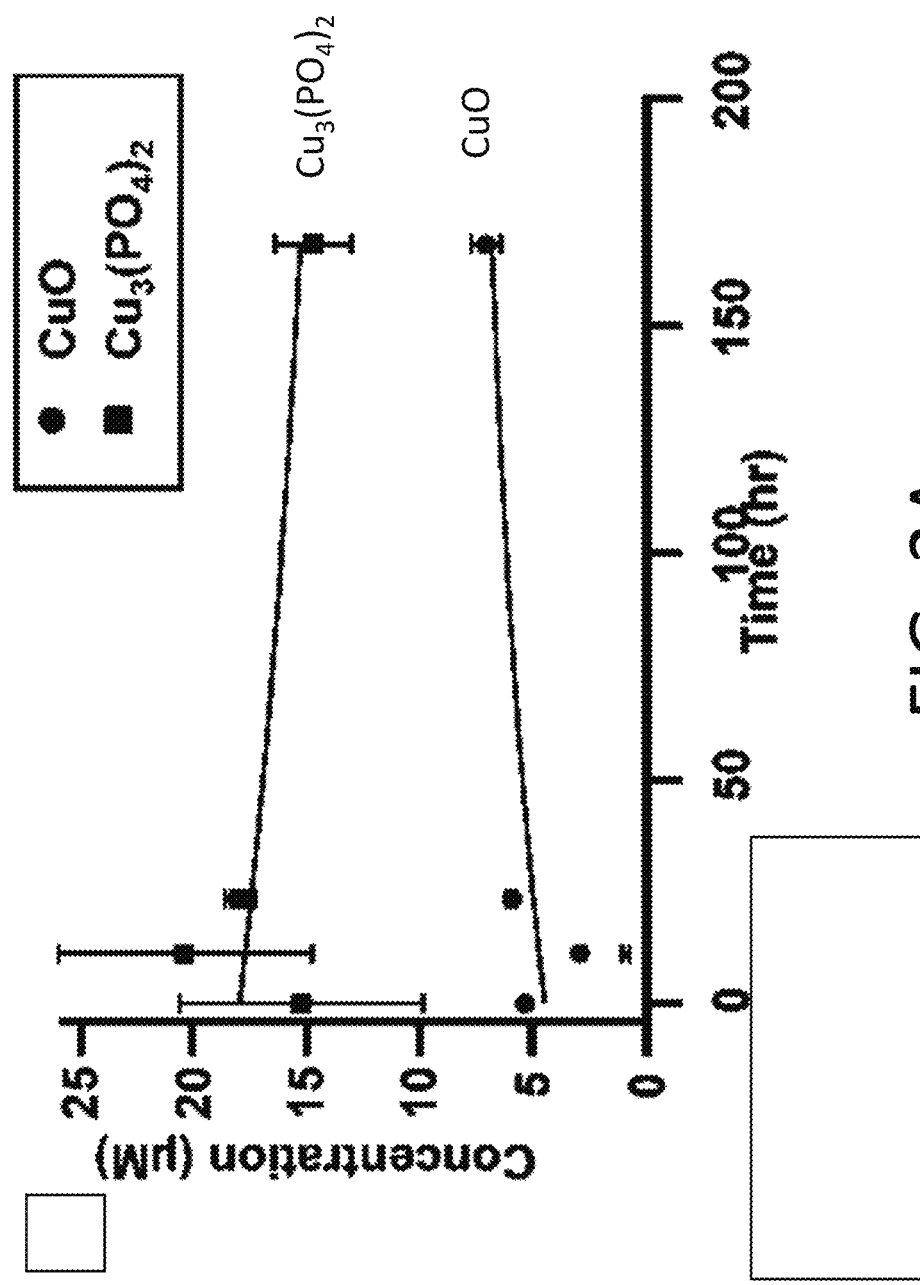
FIGS. 2A-2D depict the concentration of Cu' in solution vs. time after the indicated nanomaterials were introduced into different media at a mass concentration of 100 mg/L.
Figure 2B:
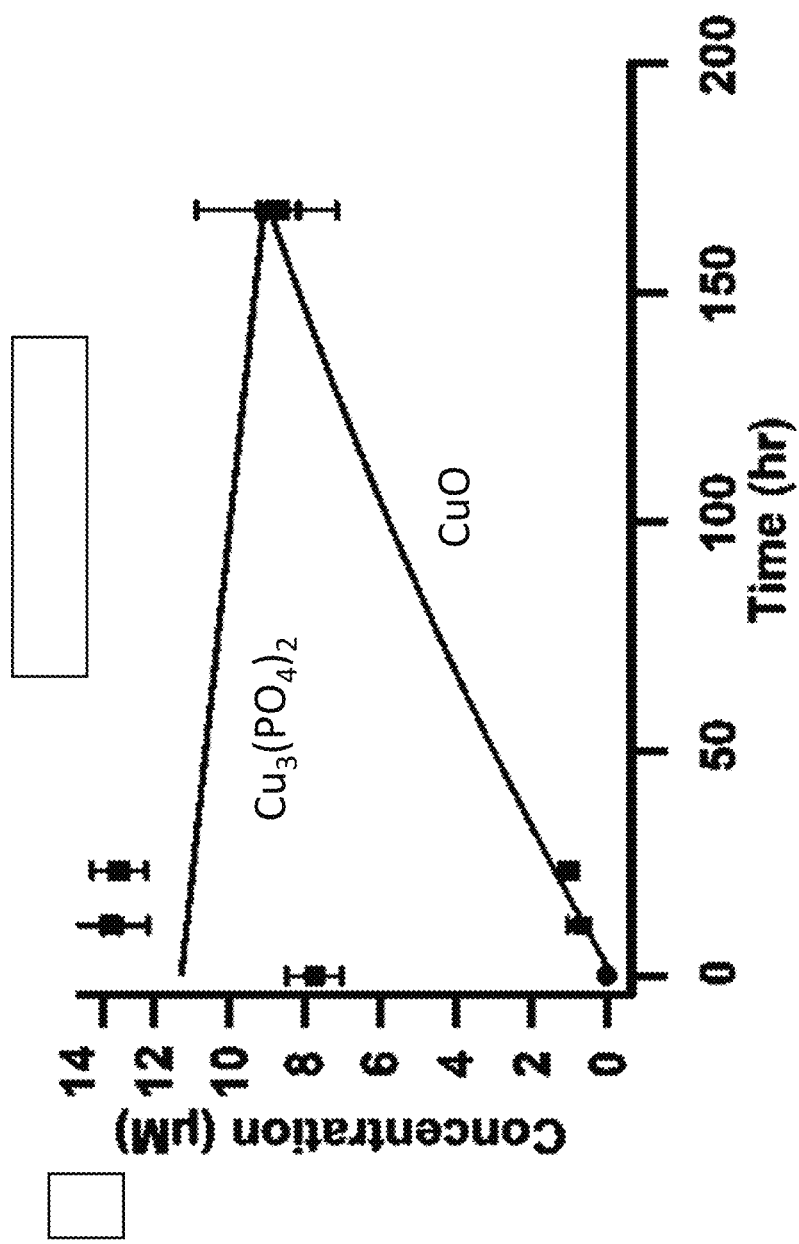
Figure 2C:
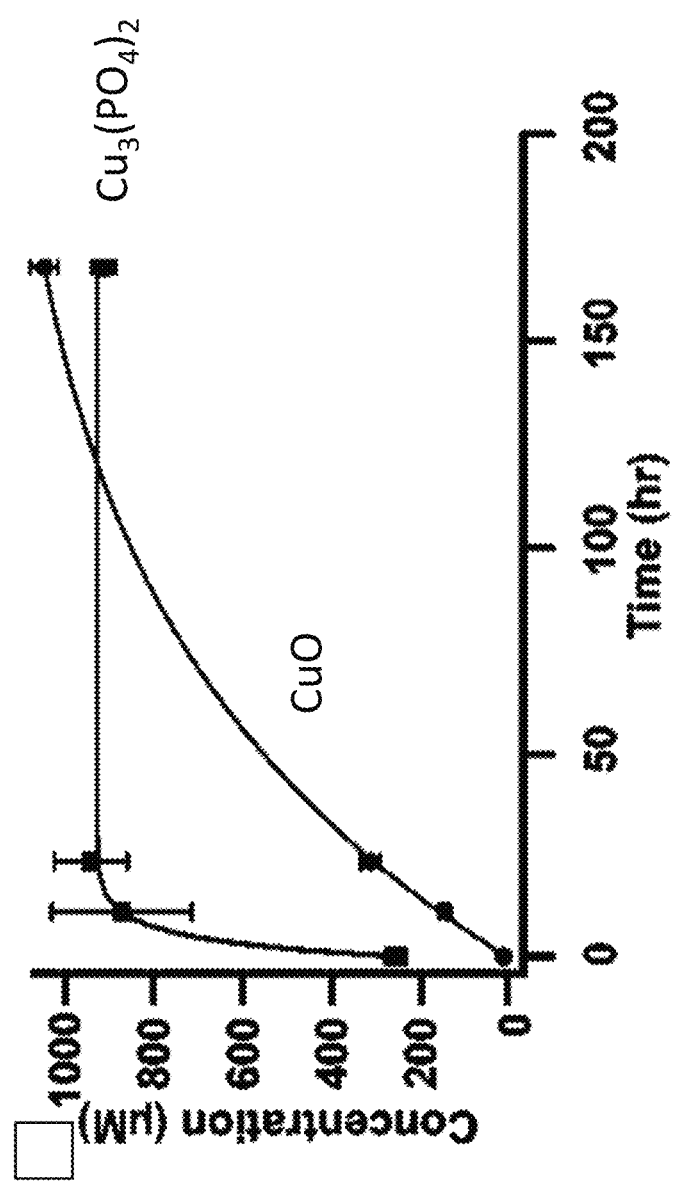
Figure 2D:
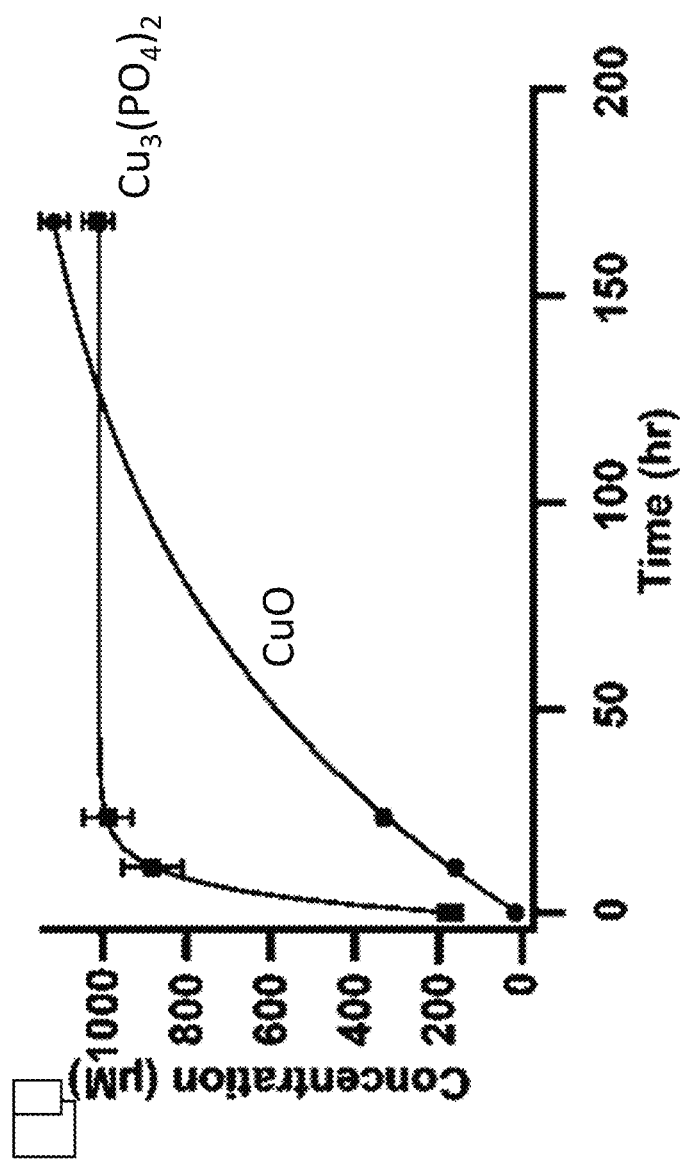

Dissolution experiments for the two nanomaterials were conducted in solutions such as DI water and simulated xylem sap (FIGS. 2A-2D). FIG. 2A shows the concentration of Cu$^{2+}$ ions produced from dissolution of the different nanoparticles. FIG. 2A shows that the Cu$_3$(PO$_4$)$_2$.3H$_2$O nanosheets had a rapid initial dissolution rate across the media studied, reaching a constant concentration after 12 hours. The slight decrease over time in FIGS. 2A and 2B may be due to minimal Cu ion re-precipitation, as both copper phosphate and copper hydroxide species. Conversely, the commercial CuO NP showed continual dissolution of the particles over the five-week study period. After one week, the aqueous Cu concentration was significantly greater for Cu$_3$(PO$_4$)$_2$.3H$_2$O nanosheets than for CuO NP, with values of 15±2.0 μM and 7.0±0.6 μM, respectively (FIG. 2A). A similar slow release profile of extractable copper ions from CuO NP-incubated in soil has been previously reported. (Gao, X. et al., *Environmental Science & Technology* 2017, 51 (4), 2226-2234.) The presence of Regulaid® in the solution reduced particle dissolution slightly for both the CuO NP and Cu$_3$(PO$_4$)$_2$.3H$_2$O nanosheets, with similar maximum copper concentrations in solution of 9±2 μM and 8.7±0.5 μM, respectively (FIG. 2B). The addition of the organic acids at concentrations approximating plant xylem levels dramatically increased the dissolved copper content by two orders of magnitude, reaching 1110±30 μM and 1010±40 μM for CuO NP and Cu$_3$(PO$_4$)$_2$.3H$_2$O nanosheets after one week, respectively. Furthermore, there was significantly more Cu leached from CuO under these conditions (FIG. 2B). It was hypothesized that the Regulaid® inhibits particle dissolution by adsorbing to and coating the nanoparticle surface, while the organic acid-based chelation of copper by organic acids may enhance dissolution, given the reported favorable binding constants of 1.299×10$^4$ and 1.801×10$^4$ M$^{-1}$ for Cu$^{2+}$ binding with malic and citric acid, respectively. Notably, the presence of Regulaid® in addition to the organic acids did not significantly reduce the rate of dissolution (FIG. 1D) compared to the organic acids without Regulaid®. Previously, the dissolution behavior of CuO films has been characterized in acidic citric acid solutions which showed Cu concentrations of <10 mg/L near pH=7, increasing at lower pH. (Ko, C. K. et al., *Surface and Interface Analysis* 2010, 42 (6-7), 1128-1130.) The addition of soluble proteins and yeast extract has also been shown to enhance Cu ion release for CuO. (Gunawan, C. et al., *ACS nano* 2011, 5 (9), 7214-7225.) To determine whether the solution was saturating, comparable dissolution studies were performed at 1000 mg/L in DI water and the organic acid matrix. When compared to the 100 mg/L experiment, the 1000 mg/L study showed an increase in the ion release from Cu$_3$(PO$_4$)$_2$.3H$_2$O nanosheets by at least a factor of two in both matrices, while CuO showed relatively small changes in the profile observed, indicating that equilibrium may be established at lower concentrations (data not shown). It is believed that the dissolution characteristics of Cu$_3$(PO$_4$)$_2$.3H$_2$O nanosheets have not been previously reported. This example shows that the environmental conditions on and within a plant may dramatically influence nanoparticle persistence, and that the more rapid dissolution of the Cu$_3$(PO$_4$)$_2$.3H$_2$O nanosheets may be related to the enhanced plant defense noted below.

In Vitro Toxicity.

To determine whether the nanomaterials could directly influence the health of *F. oxysporum*, a direct assay of fungal toxicity was performed. In the fungal toxicity test, CuO NP at 50 and 500 mg/L did not significantly impact pathogen biomass. Conversely, Cu$_3$(PO$^4$)$_2$.3H$_2$O nanosheets significantly reduced fungal biomass at 50 and 500 mg/L by 20 and 40%, respectively. These findings are in line with the dissolution data, suggesting that the more rapid release of ions from the nanosheets results in greater overall activity. Using foliar or dip application of the nanomaterials on plants means that the particles must translocate through the plant to have a direct interaction with the fungal culture. Therefore, in vitro studies may not reflect the observations noted in the greenhouse or field.

Greenhouse Studies

Dip and Root Application of Nanomaterials.

Figure 3A:
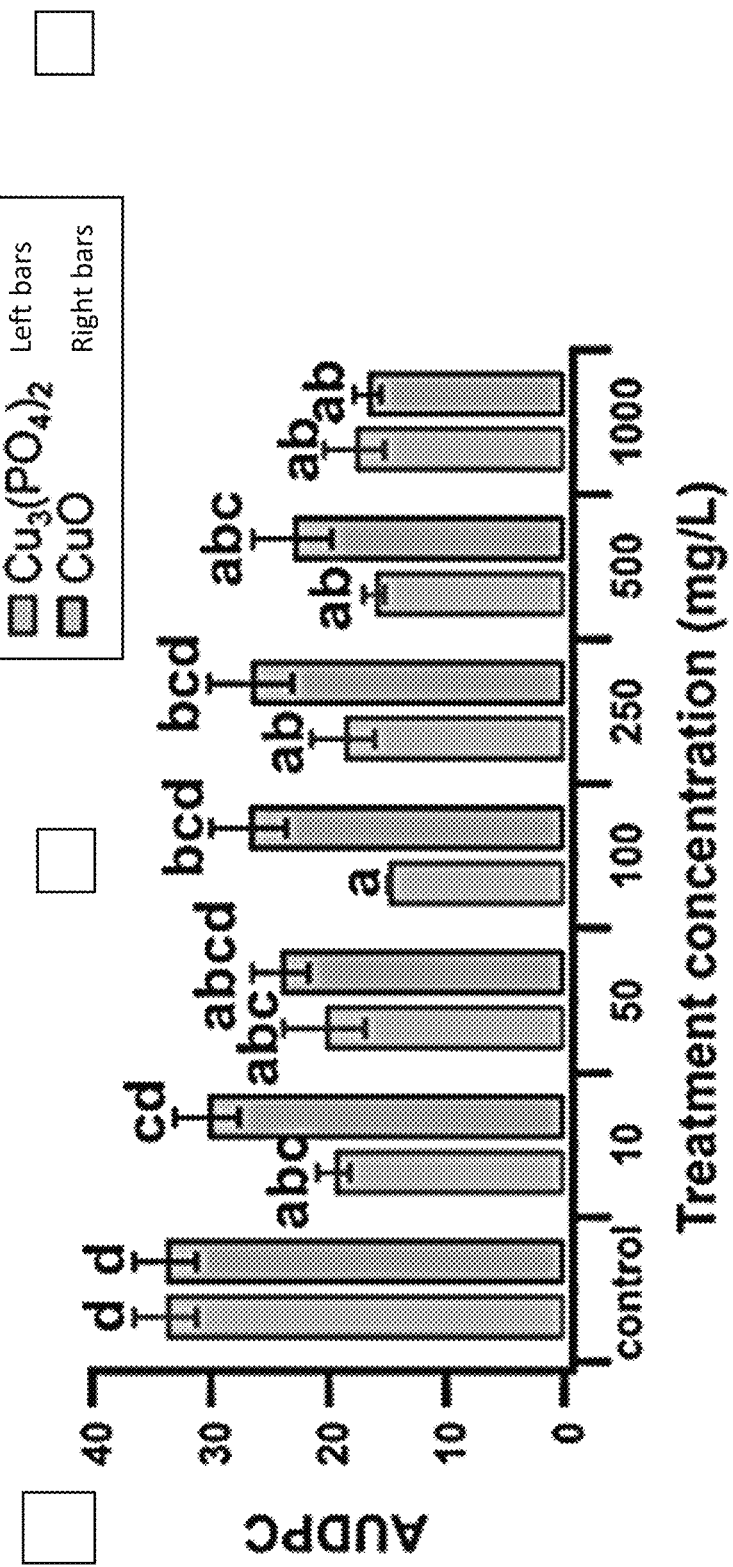
FIGS. 3A-3D depict the disease rating and fresh weight of *Fusarium* infested watermelon upon exposure to $Cu_3(PO_4)_2 \cdot 3H_2O$ nanosheets and CuO NP.

To compare the disease suppression of Cu-based nanomaterial treatments at 10-1000 mg/L concentration to an infected control that was not treated with nanomaterials, a "dip" method was used on the seedlings. This exposure method enabled a more controlled and homogenous application to the entire shoot system. To assess the progress of *Fusarium* infection during plant growth, the AUDPC was calculated, with higher values representing greater disease progression and vegetative damage. In FIG. 3A, the commercial CuO NP showed a downward trend in disease progress with increasing concentration, but statistically significant *Fusarium* suppression (50.6%) was only achieved at a dose of 1000 mg/L. Conversely, Cu$_3$(PO$_4$)$_2$.3H$_2$O nanosheets at 10 mg/L exhibited a statistically significant 58% reduction in AUDPC, with higher doses providing no additional effect (FIG. 3A). Based on the stoichiometry and as determined experimentally, CuO is 85±6% Cu by mass, while Cu$_3$(PO$_4$)$_2$.3H$_2$O is 44±4%, respectively. Therefore, in addition to the 100-fold lower amount in total concentration, the Cu$_3$(PO$_4$)$_2$.3H$_2$O nanosheets yielded significant plant defense at approximately half the Cu mass.

Figure 3B:
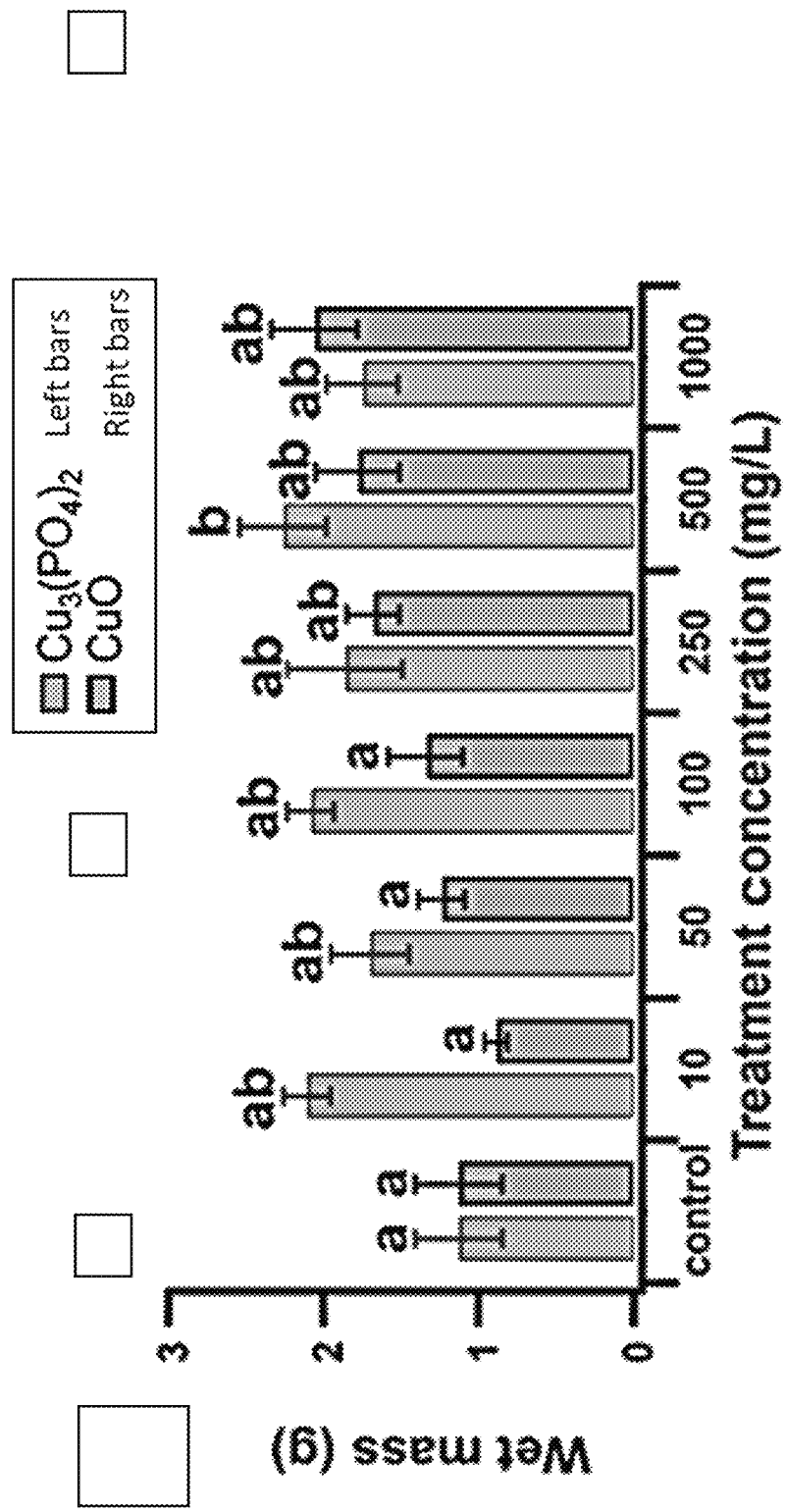
Figure 3C:
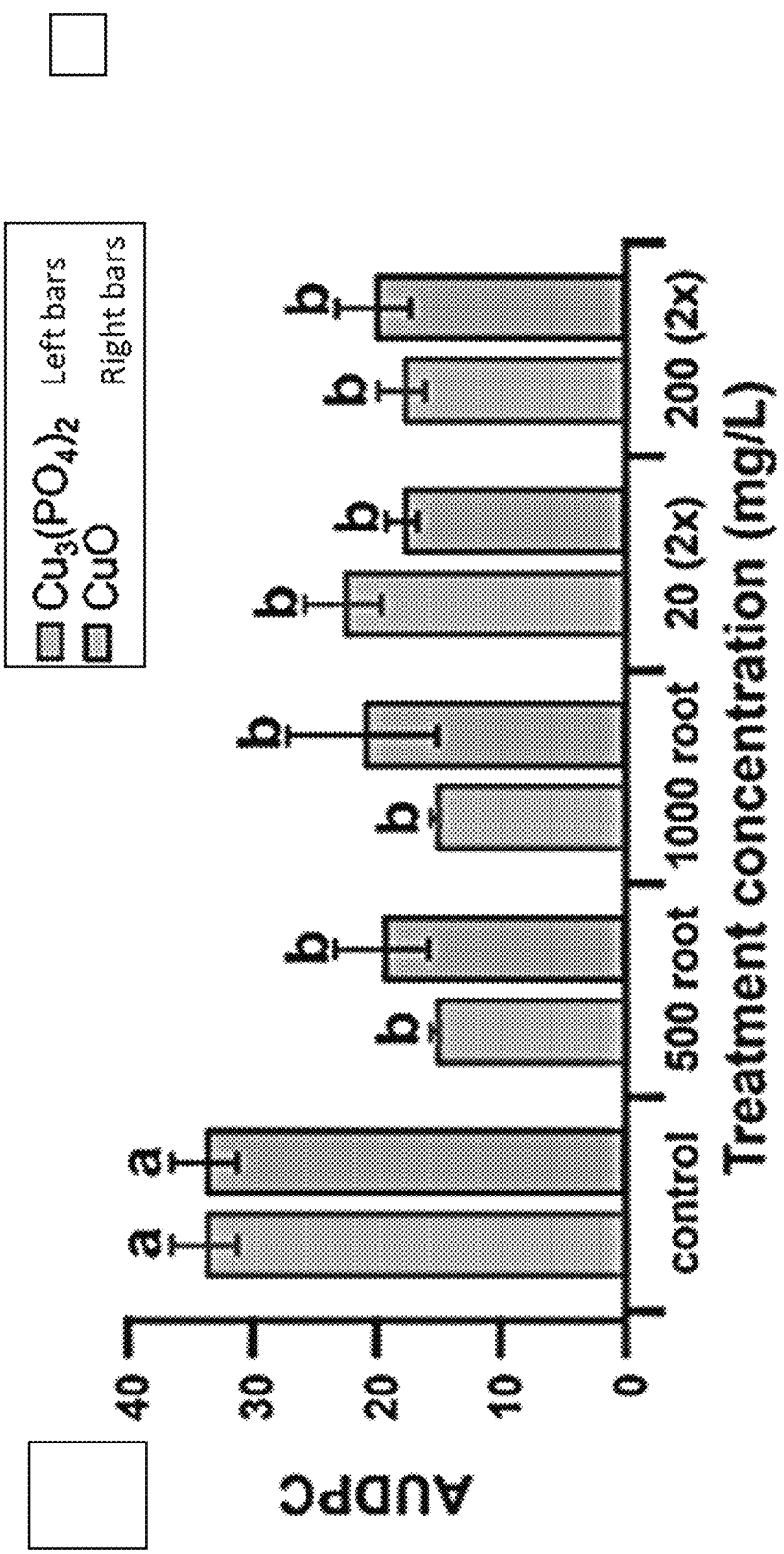

Importantly, a repeated application regime of CuO NP produced a significant reduction in the AUDPC; dual doses of 20 and 200 mg/L resulted in 46.5% and 40.3% reductions in disease (FIG. 3C). For the Cu$_3$(PO$_4$)$_2$.3H$_2$O nanosheets, the repeated application regime yielded similar resistance to disease as did the single dose at 10 mg/L. The root, shoot, and total plant wet masses were determined as a function of Cu treatment. *Fusarium* infection reduced watermelon biomass by 80.9%. For the commercial CuO NP, increasing the dose produced an upward trend in plant biomass but, unlike AUDPC, these values did not achieve statistical significance, even at 1000 mg/L (FIG. 3B). Conversely, treatment with Cu$_3$(PO$_4$)$_2$.3H$_2$O nanosheets at 10 mg/L resulted in a statistically significant increase in the biomass of plants infected with *Fusarium*. These findings are consistent with the AUDPC data. Although the higher doses of Cu$_3$(PO$_4$)$_2$.3H$_2$O nanosheets consistently produced greater biomass values, a high degree of replicate variability occasionally confounded statistical significance. In terms of biomass, repeated applications at 20 or 200 mg/L of either particle type offered no additional resistance to infection.

Figure 3D:
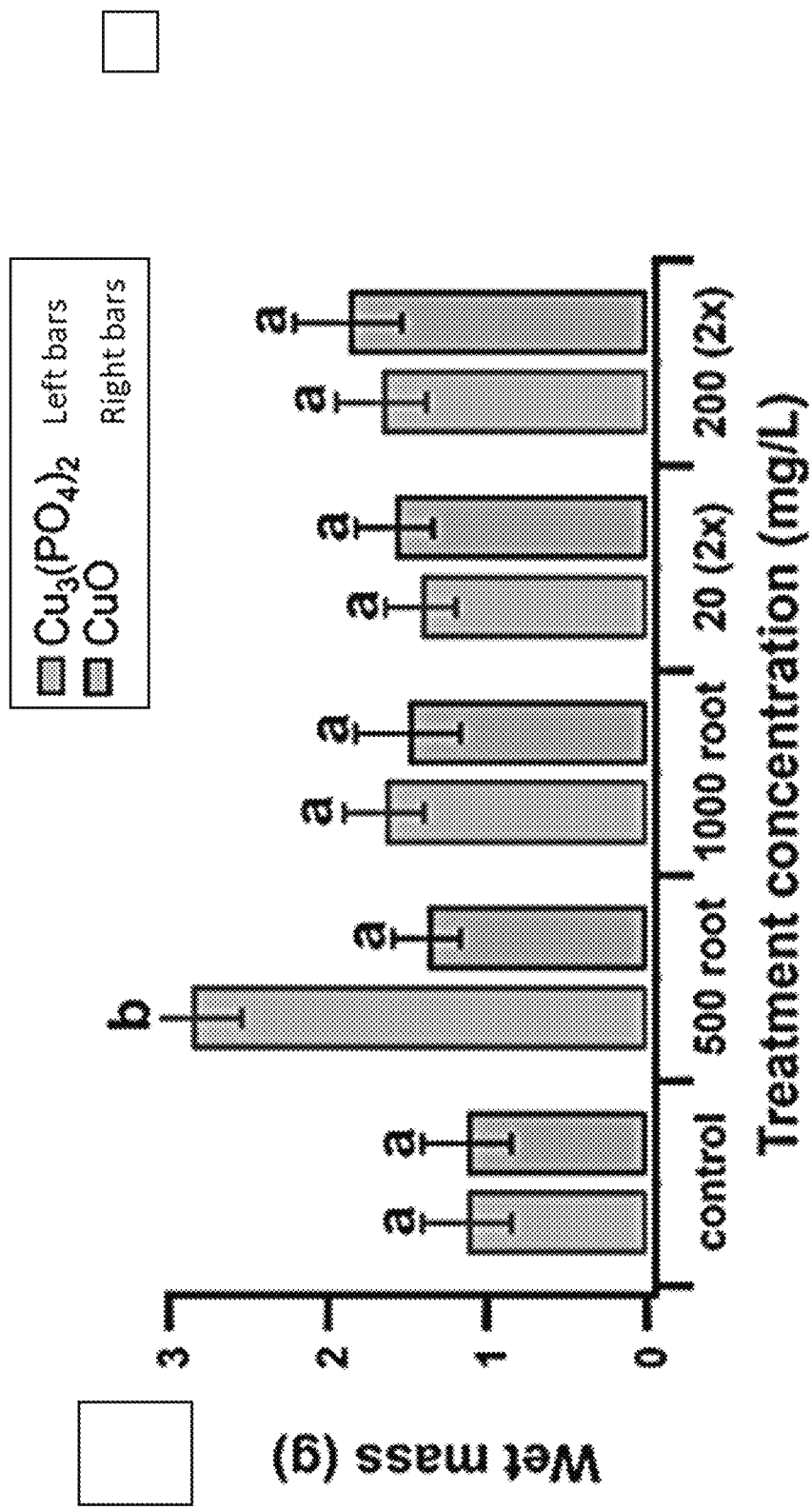

Select plants received the nanomaterials directly into the root zone. Here, a similar lack of effect of CuO NP at both doses and of the nanosheets at 1000 mg/L for the root application was observed with respect to biomass (FIG. 3D). However, the 500 mg/L root treatment with Cu$_3$(PO$_4$)$_2$.3H$_2$O nanosheets resulted in a dramatic 261% increase in total plant biomass. These results demonstrate that the Cu$_3$(PO$_4$)$_2$.3H$_2$O nanosheets effectively reduced disease at low particle concentrations without the need for repeated applications, whereas the commercial CuO NP were only partially effective at much higher doses.

Figure 4A:
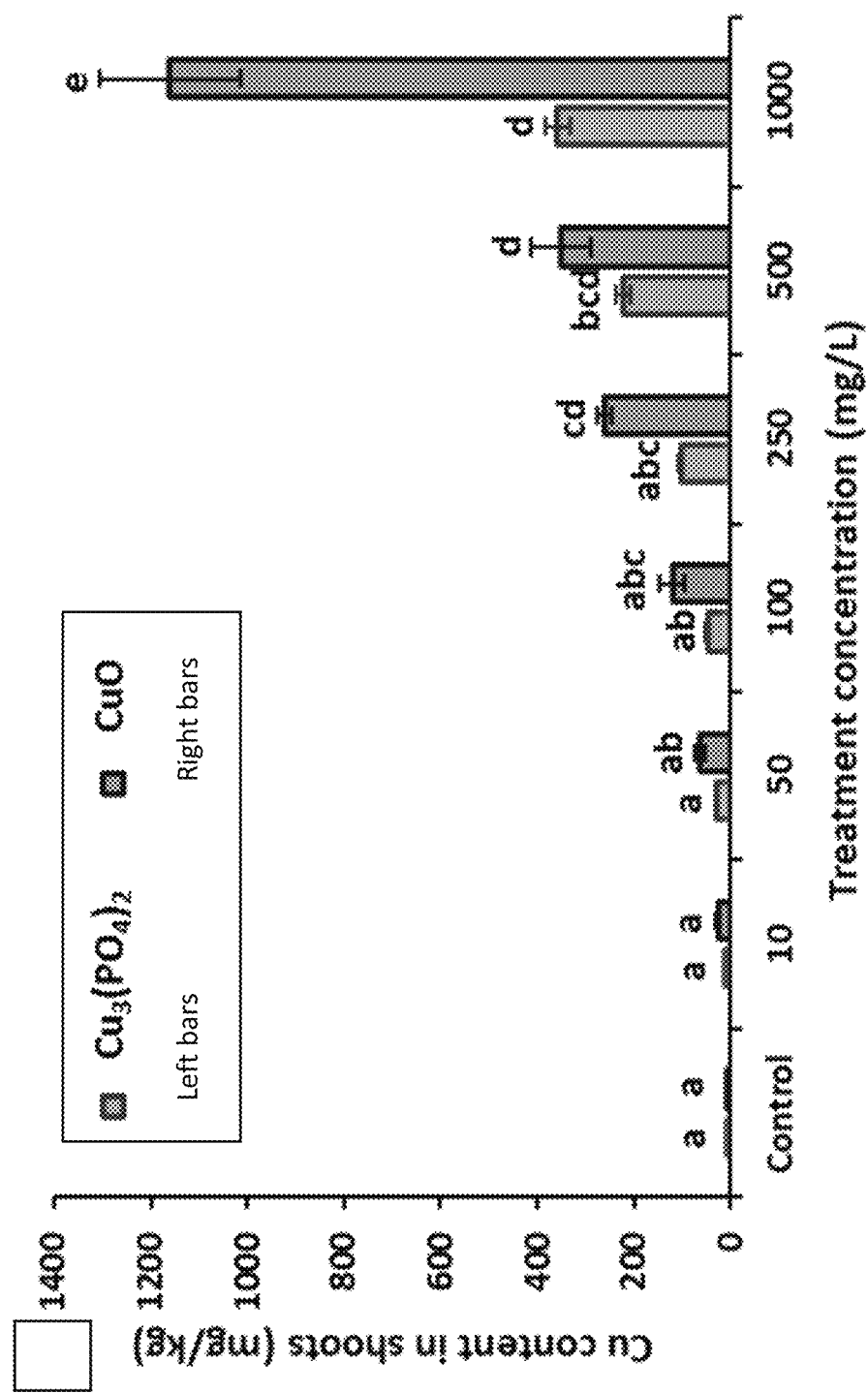
FIG. 4A shows the Cu content in *Fusarium* infected watermelon shoots upon foliar exposure to different concentrations of $Cu_3(PO_4)_2 \cdot 3H_2O$ nanosheets and CuO nanoparticles.
Figure 4B:
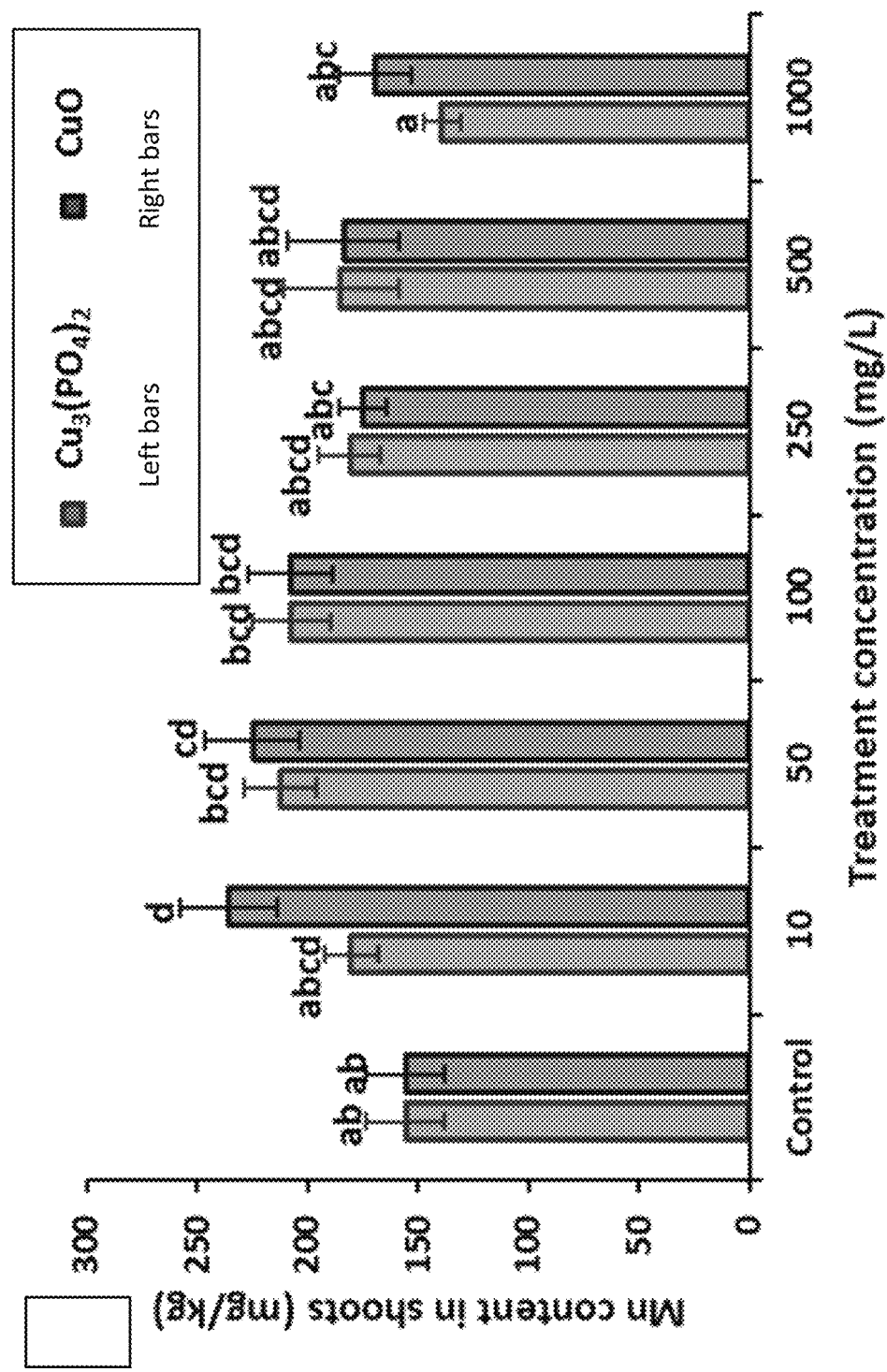
FIG. 4B shows the Mn content in *Fusarium* infected watermelon shoots upon foliar exposure to different concentrations of $Cu_3(PO_4)_2 \cdot 3H_2O$ nanosheets and CuO nanoparticles. A one-way ANOVA with an SNK multiple comparison test was used to determine significance across all the treatments. Values in each panel followed by different letters were significantly different at $p<0.05$.

The contents of both macro- (Ca, P, S, K, and Mg) and micro-nutrients (Cu, Fe, Zn, Mn, and Si) were measured in watermelon shoots and roots across all treatments (FIG. 4A and other data not shown). As shown in FIG. 4A, the shoot Cu content in diseased plants increased in a dose-dependent fashion with increasing treatment of Cu-based nanomaterials. The consistently higher levels of shoot Cu for the commercial CuO NP were the result of the greater mass fraction of this element in the molecule relative to the $Cu_3(PO_4)_2 \cdot 3H_2O$ nanosheets. If the data were normalized to amount of added Cu, the observed differences between the two materials would become minimal. Notable decreases in the root Cu content across all the *Fusarium* infested treatments were evident for both Cu nanomaterials as compared to the *Fusarium* control, although not all changes were of statistical significance (data not shown). These findings do not align with previous studies on CuO nanomaterials with a primary particle size of 30 nm. (Elmer, W. H. et al., *Environmental Science-Nano* 2016, 3 (5), 1072-1079; Elmer, W. H. et al., *Plant Disease* 2018, (ja).) While the reasons for these differences remain unknown, it is possible that the larger aggregate size of the current CuO NP may limit translocation from the shoot to the root. In the non-*Fusarium* infested treatments, the shoot Cu content increased in a dose-dependent manner, which was similar to the *Fusarium* infested treatments. Regarding other mineral elements, it is interesting to note that the root P content in the *Fusarium* infested treatments with both types of Cu nanomaterials was decreased as compared to the control (data not shown). For example, exposure to 50, 100, and 500 mg/L CuO NP greatly decreased the root P content by 14.2-21.4% relative to the *Fusarium* control. Similarly, the presence of CuO NP significantly decreased the *Fusarium* infested root K and S content. For micronutrient content, exposure to both $Cu_3(PO_4)_2$ nanosheets and CuO NP at lower levels significantly elevated the shoot Mn content in the *Fusarium* infested treatments as compared to the *Fusarium* control (FIG. 4B). In addition, the presence of CuO NP increased the shoot Si content upon infection (data not shown). Si is known to play an important role in plant defense by interacting with the plant stress signaling system and controlling the timing of disease responses. (Fauteux, F. et al., *Fems Microbiology Letters* 2005, 249 (1), 1-6.) The lack of Si change under $Cu_3(PO_4)_2 \cdot 3H_2O$ treatment suggests an overall alleviation of stress in the diseased condition relative to the CuO NP exposure.

Foliar Spray of Nanomaterials.

In greenhouse trials, a foliar spray method of CuO NP and $Cu_3(PO_4)_2 \cdot 3H_2O$ nanosheets was undertaken to investigate the impact of different application methods on disease response and yield. In the absence of disease, the nanomaterial amendments had no impact on total plant biomass. The total plant wet mass across all treatments ranged from 10.8-12.2 g (data not shown). The CuO NP slightly reduced the vine length of the watermelon plants by approximately 15%. Under disease conditions, both the total biomass and vine length of the nanomaterial-free control were reduced by more than 55%. Although treatment with CuO NP and $CuSO_4$ had no impact, $Cu_3(PO_4)_2 \cdot 3H_2O$ nanosheets significantly alleviated the decrease in vine length, resulting in values that were statistically similar to the controls (data not shown). Under disease conditions, the CuO and $Cu_3(PO_4)_2 \cdot 3H_2O$ nanomaterials significantly reduced the AUDPC by 23% and 25%, respectively, as compared to the controls, bulk, and ionic copper treatments (data not shown). Both $Cu_3(PO_4)_2 \cdot 3H_2O$ nanosheets and CuO NP increased plant mass by approximately 40% relative to the diseased controls, although the change was only statistically significant for the CuO (data not shown). There was greater consistent variability in both biomass and AUDPC in this experiment with the foliar spray. It is likely that the foliar application method resulted in less uniform and incomplete coverage of Cu materials on the plant shoot system as compared to the dip method, thereby resulting in greater variability in treatment efficacy. In addition, another reason for the variability between the AUDPC and biomass is that the AUDPC was generated from ratings taken during growth when significant delays in the onset of symptoms were evident in the $Cu_3(PO_4)_2 \cdot 3H_2O$ nanosheets treatment, whereas total biomass was recorded at final harvest when the disease had progressed in all inoculated treatments, thus reducing the likelihood of any differences being detected. In this experiment, the impact of disease and treatment on pigment production was also assessed; changes in pigment concentrations can be an indicator of plant stress. The total chlorophyll and carotenoid content significantly increased in response to disease, from 0.7±0.02 mg/g for the control to 0.9±0.2 mg/g for the diseased control (data not shown). For uninfected plants, the addition of $Cu_3(PO_4)_2 \cdot 3H_2O$ nanosheets, CuO NP, and $CuSO_4$ significantly increased total chlorophyll and carotenoid content. Under disease conditions, $CuSO_4$ and CuO NP did not significantly change the chlorophyll content when compared to the 0.9±0.2 mg/g of the diseased control, while significantly less chlorophyll was observed for $Cu_3(PO_4)_2 \cdot 3H_2O$ nanosheets with a value of 0.70±0.08 mg/g. For the healthy plants, the increased pigment concentration may be an indication of decreased plant stress and robust plant health. Conversely, in the diseased plants, the decreased chlorophyll in response to $Cu_3(PO_4)_2 \cdot 3H_2O$ nanosheets may indicate that the rapid dissolution of ions interferes with chlorophyll biosynthesis.

Field Studies.

Figure 5A:
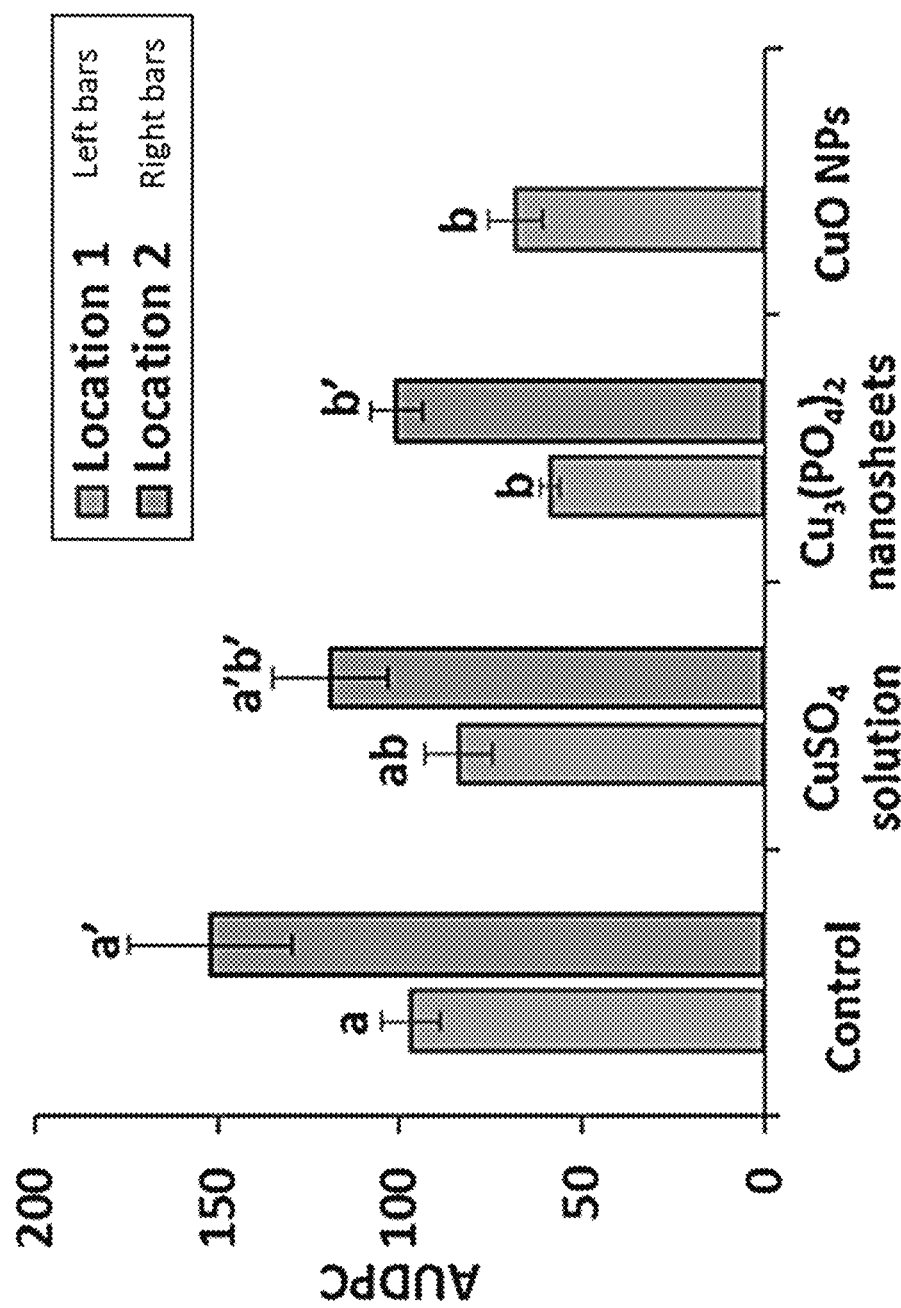
FIGS. 5A-5C show the disease progress and yield of *Fusarium* infested watermelon in Lockwood and Griswold field studies.
Figure 5B:
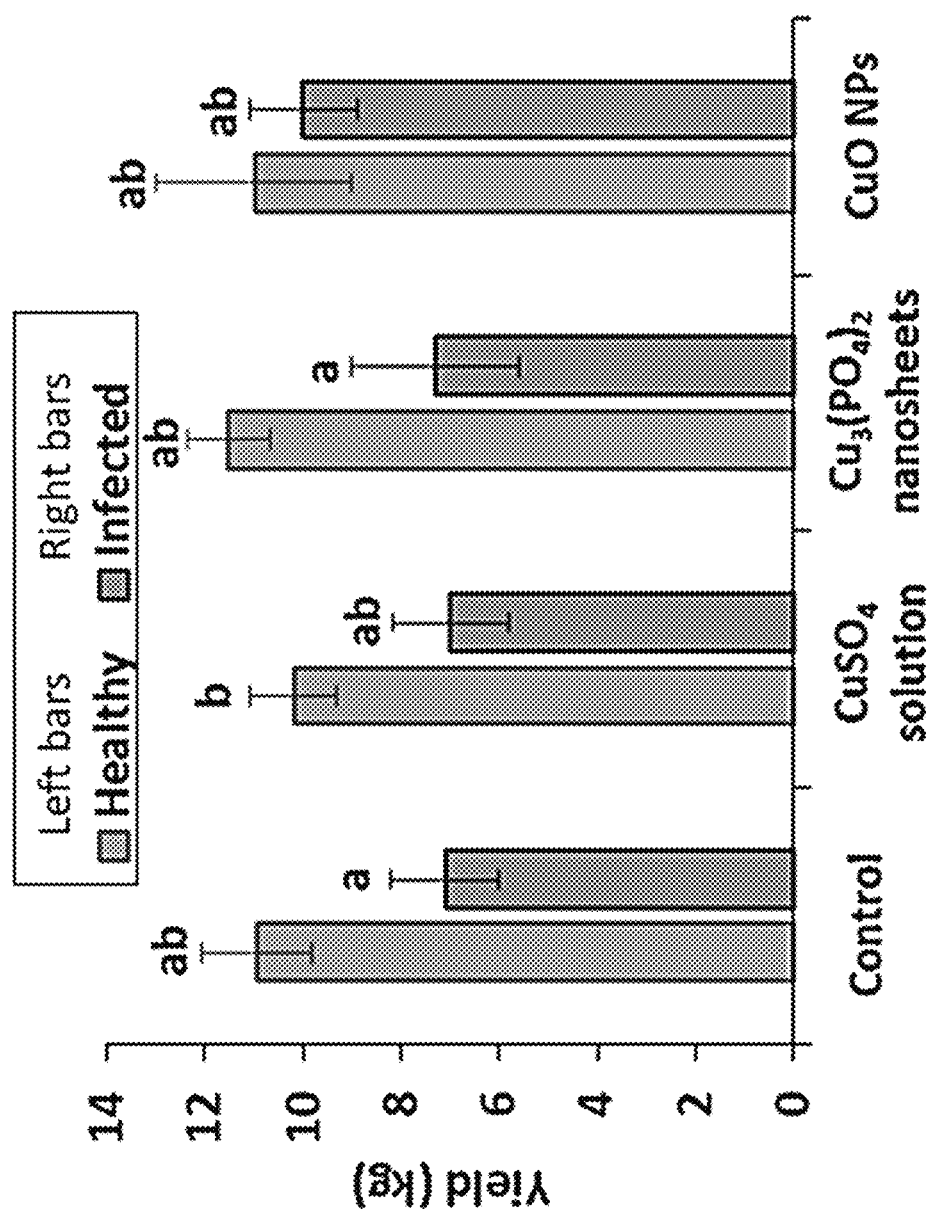
Figure 5C:
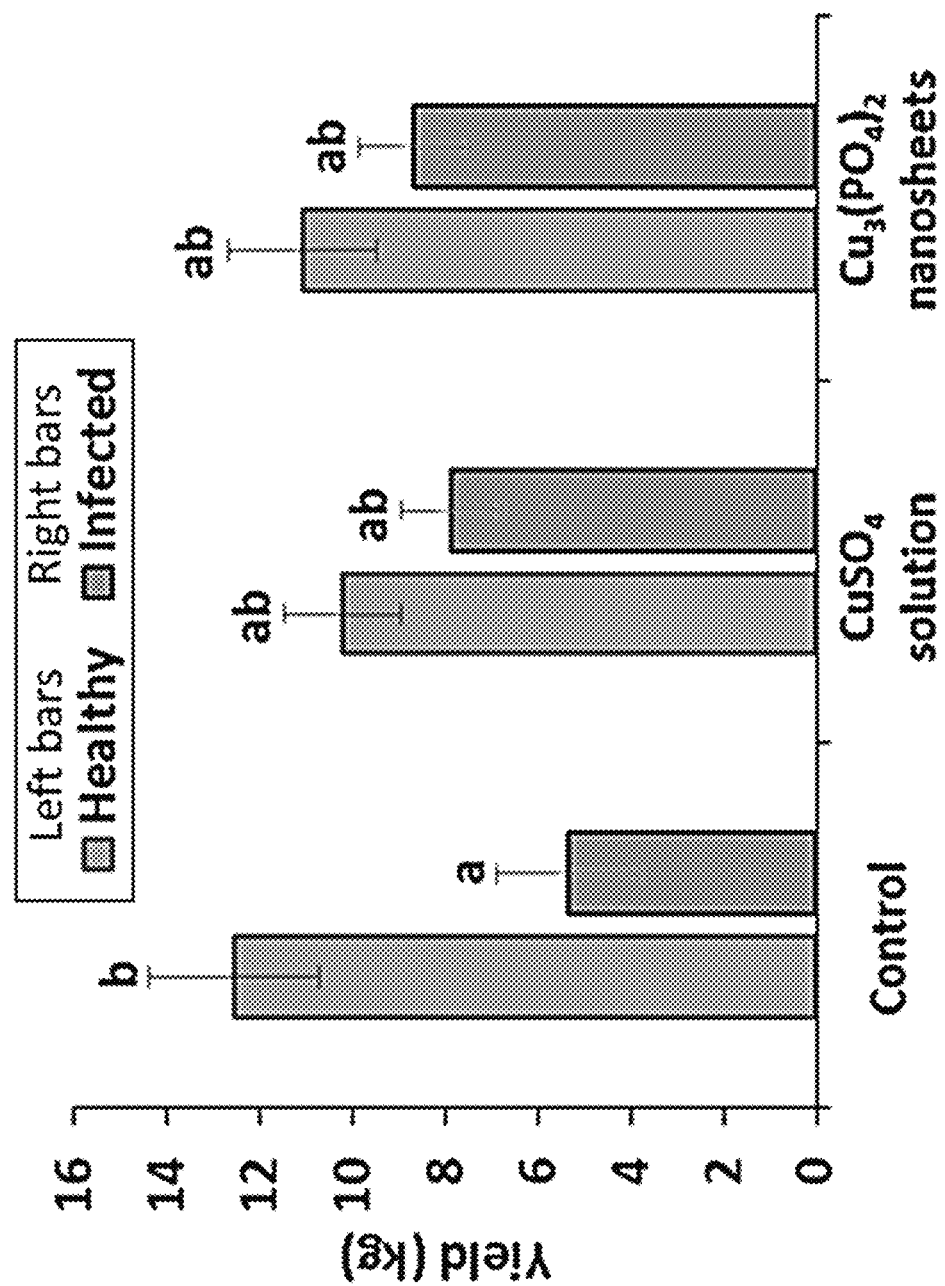
Figure 6A:
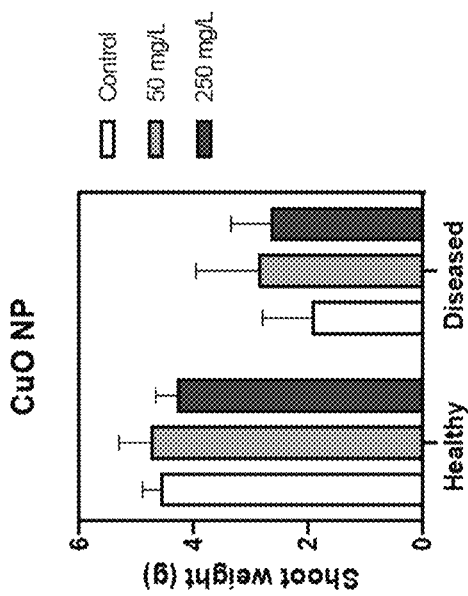
FIGS. 6A-6F illustrate the results of experiments evaluating the suppression of *Fusarium virguliforme* infection in soybean plants using applications of $Cu_3(PO_4)_2$ nanosheets, CuO nanosheets, and CuO nanoparticles.
Figure 6B:
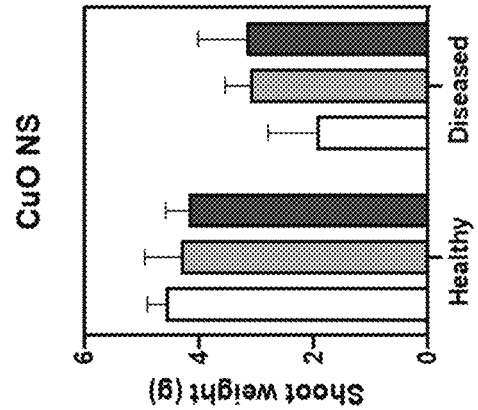
Figure 6C:
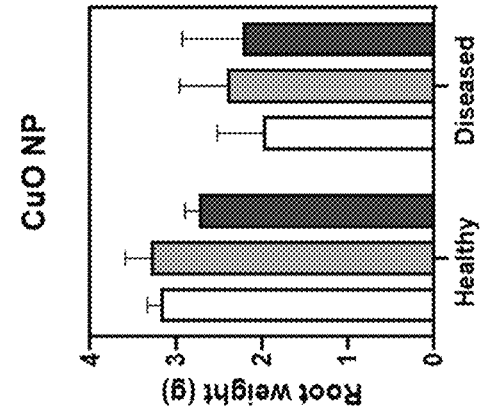
Figure 6D:
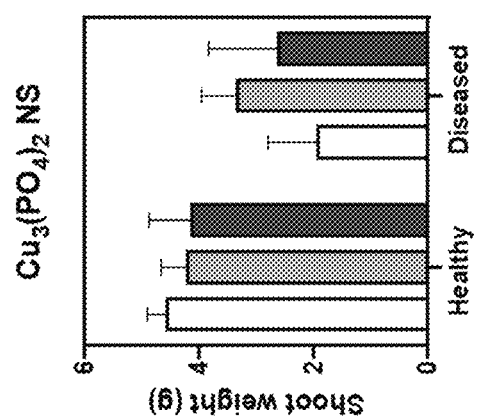
Figure 6E:
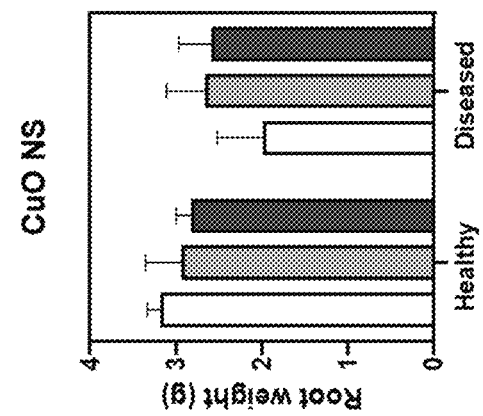
Figure 6F:
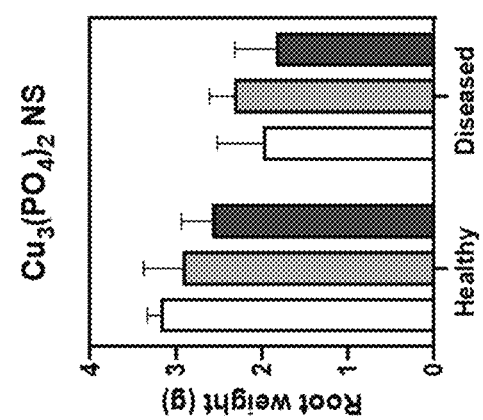

Full life cycle studies were performed at two separate field sites to determine whether the nanomaterial results seen in the greenhouse would translate to a practical field agricultural application. At both field locations, the CuO and $Cu_3(PO_4)_2 \cdot 3H_2O$ nanomaterials significantly reduced the AUDPC when compared to the diseased control, although the two chemical compositions yielded results that were statistically equivalent to each other. At location 1, FIGS. 5A-5C show that the CuO and $Cu_3(PO_4)_2 \cdot 3H_2O$ nanoparticles reduced disease by 29.9% and 39.2%, respectively. Similarly, measurements at location 2 showed that treatment with $Cu_3(PO_4)_2 \cdot 3H_2O$ reduced disease by 34%; no CuO NP treatment was established at location 2. The nanomaterial results were compared to Cu ions produced by a $CuSO_4$ salt control; these two treatments were shown to be statistically equivalent.

At both locations, the presence of disease reduced crop yield (total wet mass of fruit per replicate plot) by 34.8% (from 10.9±1.1 kg to 7.1±1.1 kg) and 57.1% (from 12.6±1.8 kg to 5.4±1.6 kg), respectively. At location 1, CuO NP increased yield by 29% over the disease condition, resulting in a value that was statistically equivalent to the untreated controls (FIG. 5B). The $Cu_3(PO_4)_2 \cdot 3H_2O$ nanosheets and $CuSO_4$ salt control offered no such benefit on total yield. However, disease reduced the average mass per fruit from 2.30 kg to 1.90 kg; treatment with $Cu_3(PO_4)_2 \cdot 3H_2O$ alleviated the per fruit mass reduction completely, producing an average value of 2.70 kg. At location 2, the $Cu_3(PO_4)_2 \cdot 3H_2O$ and $CuSO_4$ salt control treatments increased fruit yield by 38.2%, although large replicate variability resulted in a lack of statistical significance (FIG. 5C). Elemental analysis was conducted on the roots, shoots, and fruit of plants from both field locations (data not shown). In general, changes with nanoscale treatment were minimal. For the fruit from the field study at both locations, there appeared to be no increase in fruit Cu content with respect to nanoparticle treatment, but this is not entirely surprising given that the nano-applications occurred as a foliar spray to seedlings prior to transplanting into the field months prior to fruit harvest. In addition, at location 1, the fruit treated with the CuO NP showed reduced content of Zn, Si, S, P, Mn, Mg, K, and Fe. Conversely, the fruits of plants treated with $Cu_3(PO_4)_2 \cdot 3H_2O$ nanosheets showed increased concentrations of Si, Mn, Mg, Fe, and Ca and had reduced concentrations of Zn, S, P, Cu, and K. Furthermore, in response to disease, plants at location 1 showed decreased shoot Mg and Fe; increases in the root Cu and Ca concentration; and decreases in root Si and Fe. Under disease conditions, the nanomaterials increased the Mn content and CuO NP increased the Fe content. At location 2, shoot Cu, Mg, and S content decreased, and shoot Mn increased with respect to disease. No noticeable changes were observed in the roots. In response to $Cu_3(PO_4)_2 \cdot 3H_2O$ nanosheets, there was an increase in the shoot Zn content.

Taken together, the greenhouse and field studies demonstrate that nanoscale Cu treatments may be used to suppress fungal root infection and sustainably promote overall plant health and yield. Cu has been widely used in traditional agricultural practices to repress disease. However, the high volumes of Cu currently in use have led to concerns about environmental accumulation of this metal, as well as the development of resistance among pathogens. The development of nanoscale Cu delivery systems that suppress disease and increase yield at lower active nutrient concentrations represents a significant achievement. The findings of the present Example illustrate the significance of nanomaterial formulation. The $Cu_3(PO_4)_2 \cdot 3H_2O$ nanosheets were significantly more effective than CuO NP, with 100× less mass needed to produce the same result in greenhouse studies, and nearly half the amount of Cu delivered on a per gram basis.

CONCLUSIONS

In summary, $Cu_3(PO_4)_2 \cdot 3H_2O$ nanosheets and commercial CuO NP were applied to watermelon plants infected with *Fusarium* wilt to determine the role of ion release profile and nanomaterial composition/structure on disease suppression in greenhouse and field studies. The greenhouse studies indicated that the $Cu_3(PO_4)_2 \cdot 3H_2O$ nanosheets reduced disease at a significantly lower mass concentration of particles, as compared to CuO NP. The efficacy of the materials may be attributed to the reduced overall particle size, unique particle structure (sheets), and more rapid initial release of ions from $Cu_3(PO_4)_2 \cdot 3H_2O$ nanosheets compared to the CuO NP. Both Cu nanomaterials exhibited similar efficacy in field trials involving full life cycle plant growth, in spite of the fact that the amendment occurred only once at the seedling stage. These results indicate that $Cu_3(PO_4)_2 \cdot 3H_2O$ nanosheets and similar materials are useful for agricultural applications.

Example 2

The experiments described in Example 1, above, were repeated, but using different plants and different sources of infection. In this Example, however, additional transcriptomic analysis was conducted to evaluate the effect of the $Cu_3(PO_4)_2$ nanosheet treatment on the expression of three genes important to plant defense, polyphenol oxidase (PPO), PTI5 (a transcriptional regulator for multiple defense genes) and PR1A1 (plant resistance protein). The results are summarized below.

Suppression of *Fusarium oxysporum* Infection in Tomato Plants.

A 500 mg/L suspension of $Cu_3(PO_4)_2$ nanosheets was applied to tomato plants, *Solanum lycopersicum* L., that were infested with *Fusarium oxysporum* f. sp. *lycopersici*. The disease progression, wet mass and transcriptomics of the infested plants were all monitored. Treatment with $Cu_3(PO_4)_2$ nanosheets decreased the disease progression by approximately 32% compared with the disease progression in plants that were not treated with $Cu_3(PO_4)_2$ nanosheets. In addition, experiments were conducted evaluating the influence of $Cu_3(PO_4)_2$ nanosheets and CuO nanoparticles on the biomass harvested from infected tomato plants at different time points. After 14 days, for example, plants that were exposed to $Cu_3(PO_4)_2$ nanosheets and then transplanted to soil inoculated with *Fusarium* yielded biomass statistically equivalent to that of plants that were transplanted into soil not inoculated with *F. oxysporum*, while plants that were transplanted into soil inoculated with *F. oxysporum* but not previously treated with nanoparticles exhibited biomass only 53% compared to plants that were in soil that was not inoculated. In the absence of inoculum, treatments of $Cu_3(PO_4)_2$ nanosheets did not alter the expression of genes that are related to plant defense which include PPO, PTI5, and PR1A1. In contrast, in the first 7 days of exposure $Cu_3(PO_4)_2$ tomato plants exposed to *F. oxysporum* showed a 2.5 to 5-fold increase in the expression of all defense related genes. These results indicate that $Cu_3(PO_4)_2$ nanosheets may facilitate plant defense pathways to decrease the disease progression and increase the amount of biomass collected under disease conditions.

Suppression of *Fusarium virguliforme* Infection in Soybean Plants.

A 50 mg/L solution of $Cu_3(PO_4)_2$ nanosheets was applied to *Glycine max* plants. The plants were then transplanted in to control soil and soil infested with *Fusarium virguliforme*. In the absence of disease, $Cu_3(PO_4)_2$ nanosheet treatments did not significantly impact the growth of soybean biomass. In contrast, the $Cu_3(PO_4)_2$ treatment increased the biomass of infected soybeans by 72.7% when compared to untreated-diseased plants. In addition, it was found that a suspension of 50 mg/L of CuO nanosheets applied to soybean plants increased the biomass by 1.6-fold when compared to the untreated diseased plants. These results indicate that Cu-containing nanosheets can increase plant growth under diseased conditions. The results of the experiments with soybean plants are shown in FIGS. 6A-6F.

Example 3

Figure 7:
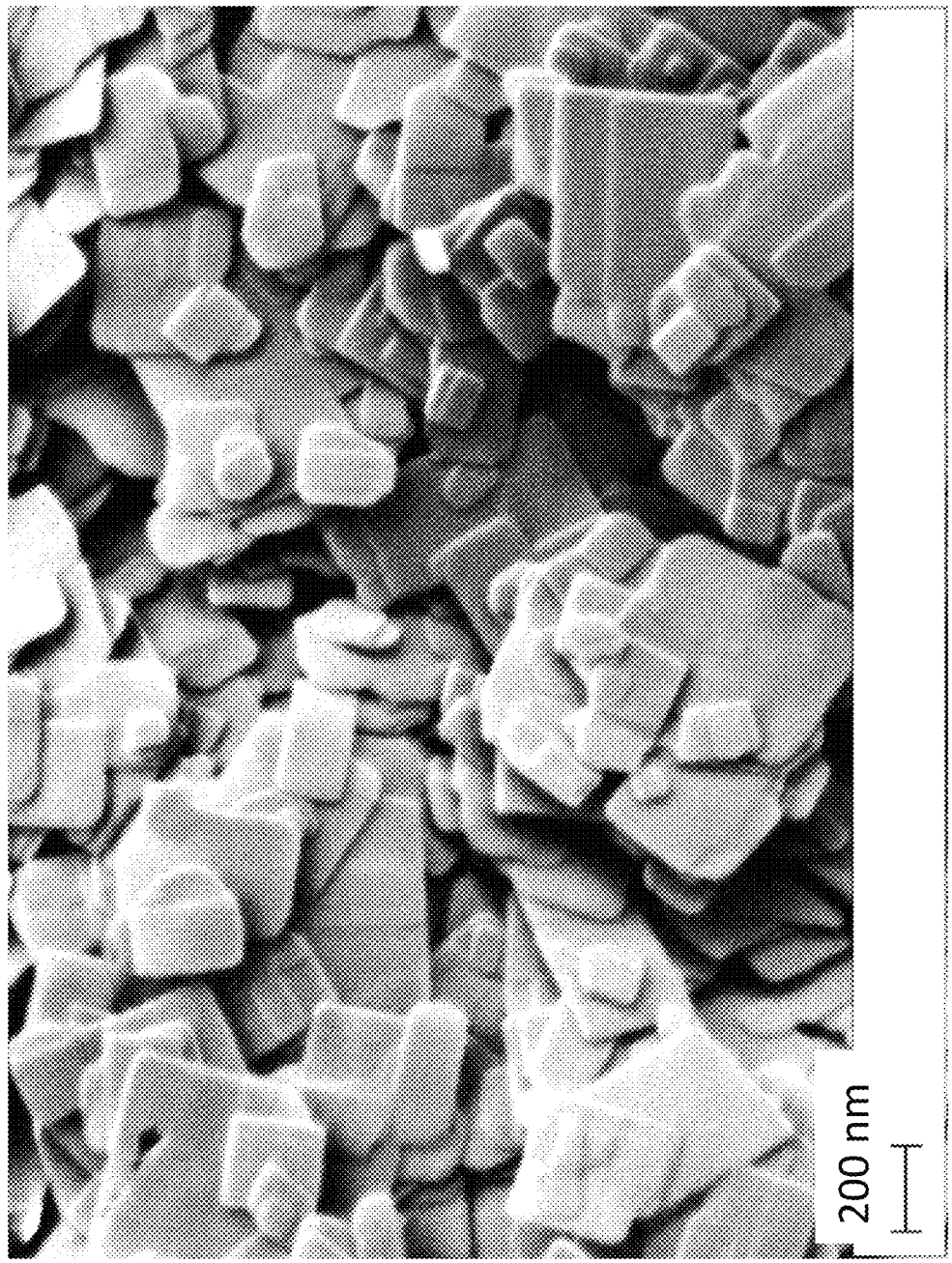
FIG. 7 shows an SEM image of $Cu_3(PO_4)_2$ nanosheets synthesized using $Na_2HPO_4$ as the phosphate precursor.

$Cu_3(PO_4)_2$ nanosheets were synthesized similar to that described in Example 1, above, but using different starting reagents, reaction pH and reaction temperature. The results demonstrate control over the dimensions of the nanosheets and distributions of dimensions. To determine the effect of each parameter only one variable was changed at a time; the synthesis method that was modified initially used ammonium phosphate, $CuCl_2$, diethylene glycol, and a final reaction temperature of 180° C. Phosphate precursors included $Na_2HPO_4$, $NaH_2PO_4$, and $Na_3PO_4$ and copper precursors included $CuNO_3$, $CuSO_4$, and $CuBr_2$. All reaction conditions produced $Cu_3(PO_4)_2$ nanosheets indicating that the reaction is robust. For example, FIG. 7 shows an SEM image of $Cu_3(PO_4)_2$ nanosheets synthesized using $Na_2HPO_4$ as the phosphate precursor. The lateral dimensions of the $Cu_3(PO_4)$ were tuned by altering the starting reagents used and the reaction pH. Synthesis with a $Na_3PO_4$ phosphate precursor produced $Cu_3(PO_4)_2$ nanosheets with the largest distribution of lateral dimensions which ranged from 42 nm to 7 μm; the average width and length of these particles were 400±600 nm and 600±1000 nm, respectively. $Cu_3(PO_4)_2$ nanosheets synthesized using a $NaH_2PO_4$ precursor had the narrowest distribution of lateral dimensions ranging from 80 to 350 nm. In addition, the nanosheets synthesized with $NaH_2PO_4$ had the smallest lateral dimensions with an average width of 130±70 nm and an average length of 50±70 nm. The aspect ratios of synthesized $Cu_3(PO_4)_2$ nanosheets ranged from 1.6:1 to 1.2:1 for particles synthesized with a $CuNO_3$ precursor and a $NaH_2PO_4$ precursor. In addition, increasing the reaction temperature by 20° C. qualitatively decreased the particle thickness by a factor of two.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the invention to enable one skilled in the art to utilize the disclosure in various embodiments and with various modifications as suited to the particular use contemplated. It is intended that the scope of the disclosure be defined by the claims appended hereto and their equivalents.

What is claimed is:

1. A plant fungicide composition or plant bactericide composition for treating plants, the composition comprising a chemical compound selected from the group consisting of $Cu_3(PO_4)_2 \cdot 3H_2O$, $Zn_3(PO_4)_2$, $(Cu/Zn)_3(PO_4)_2$, $(Cu/Al)_3(PO_4)_2$, $Mn_3(PO_4)_2$, and combinations thereof, wherein the chemical compound is in the form of a plurality of nanosheets.

2. The plant fungicide composition or plant bactericide composition of claim 1, the composition providing about a 10% release of metal ions within the first hour of dissolving at 25° C. with a starting concentration of 100 mg/L in water.

3. The plant fungicide composition or plant bactericide composition of claim 1, wherein the chemical compound is $Cu_3(PO_4)_2 \cdot 3H_2O$.

4. The plant fungicide composition or plant bactericide composition of claim 1, wherein the plurality of nanosheets have an average thickness of less than 20 nm as determined by atomic force microscopy and average lateral dimensions each in a range of from 100 nm to 500 nm as determined by atomic force microscopy.

5. The plant fungicide composition or plant bactericide composition of claim 1, further comprising a stabilizer, a surfactant, a fertilizer, an insecticide, or combinations thereof.

6. The plant fungicide composition or plant bactericide composition of claim 1, further comprising a liquid medium, wherein the plurality of nanosheets are suspended in the liquid medium.

7. The plant fungicide composition or plant bactericide composition of claim 1, the composition providing an increase in plant yield of at least 30% as compared to an untreated plant.

8. The plant fungicide composition or plant bactericide composition of claim 1, the composition providing a decrease in progression of *Fusarium* disease of at least 30% as compared to an untreated plant.

9. The plant fungicide composition or plant bactericide composition of claim 8, wherein the chemical compound is $Cu_3(PO_4)_2 \cdot 3H_2O$.

10. A method of treating a plant, the method comprising applying the plant fungicide composition or plant bactericide composition of claim 1 to at least a portion of a plant.

11. The method of claim 10, wherein the plant fungicide composition or plant bactericide composition is directly applied to foliage of the plant.

12. The method of claim 10, wherein the plant fungicide composition or plant bactericide composition is not directly applied to roots of the plant.

13. The method of claim 10, wherein the method comprises only a single application of the plant fungicide composition or plant bactericide composition.

14. The method of claim 10, wherein the method achieves a decrease in disease progression in the plant of at least 50% after a single application of the plant fungicide composition or plant bactericide composition, wherein the composition comprises $Cu_3(PO_4)_2 \cdot 3H_2O$ at 10 mg/mL in water, the plant is a watermelon plant, the disease is *F. oxysporum* f. sp. *niveum*, and the application step follows a dip exposure protocol.

* * * * *

UNITED STATES PATENT AND TRADEMARK OFFICE
CERTIFICATE OF CORRECTION

PATENT NO. : 10,820,588 B2  
APPLICATION NO. : 16/549005  
DATED : November 3, 2020  
INVENTOR(S) : Robert John Hamers et al.

Page 1 of 1

It is certified that error appears in the above-identified patent and that said Letters Patent is hereby corrected as shown below:

In the Specification

Column 2, Line 16:  
Delete the phrase "the concentration of Cu' in solution" and replace with --the concentration of $Cu^{2+}$ in solution--.

Column 9, Lines 9-10:  
Delete the phrase "AUDPC = $\Sigma(Y_i \pm Y_{(i\pm1)}]/2 \times (t_{(i\pm1)} - t_i)$," and replace with --AUDPC = $\Sigma[Y_i + Y_{(i+1)}]/2 \times (t_{(i+1)} - t_i)$,--.

In the Claims

Claim 1, Column 17, Line 46:  
Delete the phrase "$Cu_3(PO_4)_2.3H_2O$," and replace with --$Cu_3(PO_4)_2 \cdot 3H_2O$,--.

Claim 3, Column 18, Line 5:  
Delete the phrase "$Cu_3(PO_4)_2.3H_2O$." and replace with --$Cu_3(PO_4)_2 \cdot 3H_2O$.--.

Claim 9, Column 18, Line 30:  
Delete the phrase "$Cu_3(PO_4)_2.3H_2O$." and replace with --$Cu_3(PO_4)_2 \cdot 3H_2O$.--.

Claim 14, Column 18, Line 47:  
Delete the phrase "$Cu_3(PO_4)_2.3H_2O$" and replace with --$Cu_3(PO_4)_2 \cdot 3H_2O$--.

Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*